(12) United States Patent
Milkov et al.

(10) Patent No.: US 11,536,847 B2
(45) Date of Patent: Dec. 27, 2022

(54) HIGH DYNAMIC RANGE RECEIVER FOR A LIDAR SENSOR

(71) Applicant: Continental Automotive Systems, Inc., Auburn Hills, MI (US)

(72) Inventors: Mihail Milkov, Moorpark, CA (US); Kyle LaFevre, Laguna Beach, CA (US); Osman Musa, Santa Barbara, CA (US); Patrick B Gilliland, Santa Barbara, CA (US); Roger Frederick DuPont, Baden-Wuerttemberg (DE)

(73) Assignee: Continental Autonomous Mobility US, LLC, Auburn Hills, MI (US)

( * ) Notice: Subject to any disclaimer, the term of this patent is extended or adjusted under 35 U.S.C. 154(b) by 663 days.

(21) Appl. No.: 16/669,600

(22) Filed: Oct. 31, 2019

(65) Prior Publication Data
US 2021/0132229 A1    May 6, 2021

(51) Int. Cl.
| | |
|---|---|
| *G01S 17/931* | (2020.01) |
| *G01S 17/14* | (2020.01) |
| *G01S 7/28* | (2006.01) |
| *G01S 7/483* | (2006.01) |

(52) U.S. Cl.
CPC ............ *G01S 17/931* (2020.01); *G01S 7/28* (2013.01); *G01S 7/483* (2013.01); *G01S 17/14* (2020.01)

(58) Field of Classification Search
CPC .......... G01S 17/931; G01S 7/28; G01S 7/483; G01S 17/14; G01S 7/4863; G01S 17/894; G01S 17/87; G01S 17/10
USPC .......................................... 340/5.7
See application file for complete search history.

(56) References Cited

U.S. PATENT DOCUMENTS

| | | | |
|---|---|---|---|
| 9,069,080 B2 | 6/2015 | Stettner et al. | |
| 9,971,024 B2* | 5/2018 | Schwarz | G01S 7/4812 |
| 10,345,447 B1* | 7/2019 | Hicks | G01S 7/4863 |
| 11,275,155 B1* | 3/2022 | Phillips | G01S 7/4816 |
| 2012/0068052 A1* | 3/2012 | Sakura | H03F 3/08 250/214 A |
| 2017/0307738 A1 | 10/2017 | Schwarz et al. | |
| 2018/0074196 A1 | 3/2018 | Weinberg | |
| 2018/0275280 A1 | 9/2018 | Eken et al. | |
| 2019/0317196 A1* | 10/2019 | Denham | G01S 7/4861 |

OTHER PUBLICATIONS

International Search Report and the Written Opinion of the International Searching Authority dated Apr. 15, 2021 for the counterpart PCT Application No. PCT/US2020/058194.

* cited by examiner

*Primary Examiner* — Nam V Nguyen

(57) ABSTRACT

A receiver circuit for a sensor includes a photosensitive input circuit and a logarithmic-signal circuit including a PN junction coupled to a pulse voltage node. The pulse voltage node may be coupled to the P-type terminal of the PN junction and an output of the photosensitive input circuit. In some examples, the receiver circuit also may include a linear-signal circuit and/or a square-root-signal circuit.

18 Claims, 17 Drawing Sheets

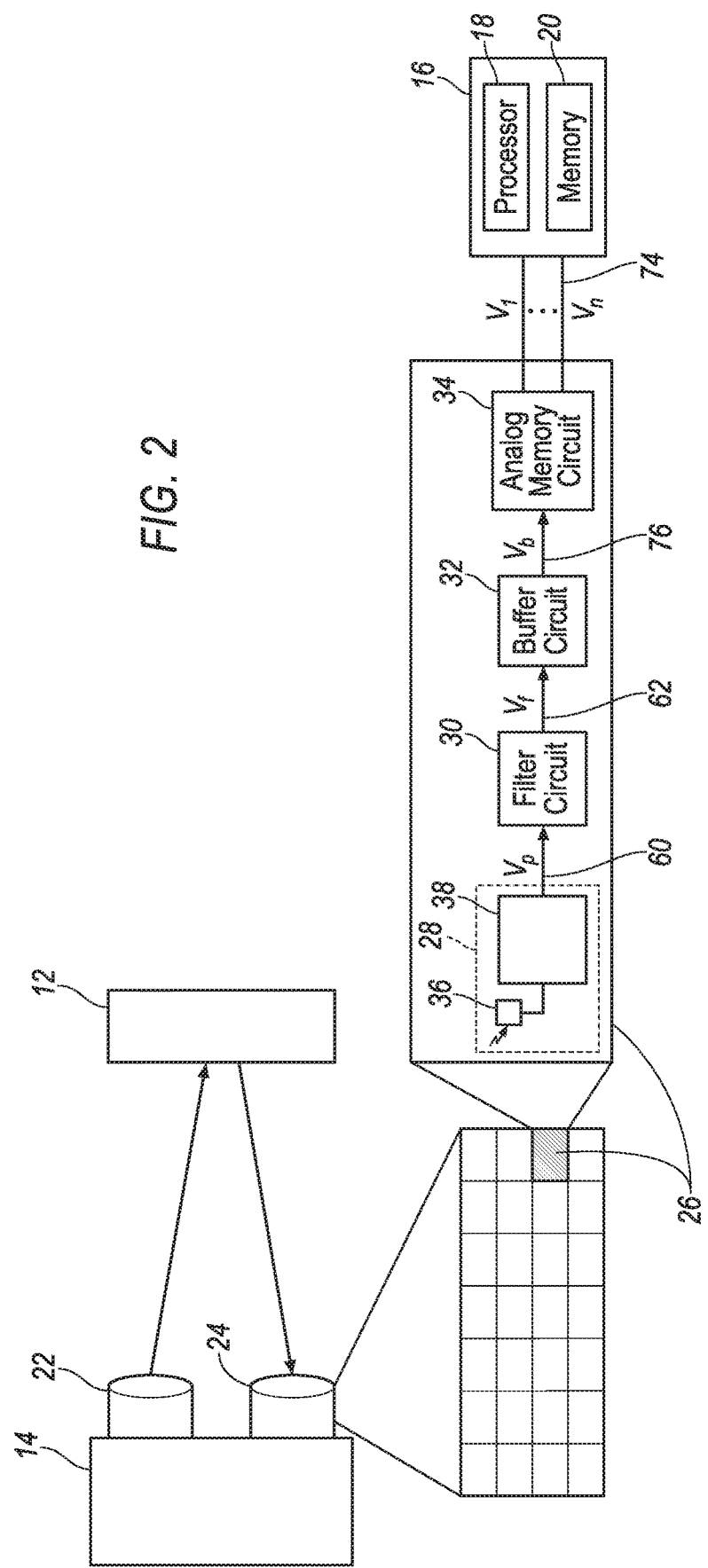

US 11,536,847 B2

HIGH DYNAMIC RANGE RECEIVER FOR A LIDAR SENSOR

BACKGROUND

One or more computers in an autonomous vehicle (or self-driving car) can be programmed to navigate the vehicle based on vehicle sensor data. The vehicle computers may rely on object detection data, e.g., "point cloud" data generated from light detection and ranging (LIDAR) sensor data to navigate the vehicle to a destination. An object detection sensor typically includes a receiver to detect an electromagnetic wave such as light received from a sensor field of view. However, current methods and technologies for sensor receivers may not provide a sufficiently high dynamic range for detecting objects.

BRIEF DESCRIPTION OF THE DRAWINGS

FIG. 2 is an example block diagram of the object detection sensor shown in FIGS. 1A, 1B, 1C illustrating a schematic view of a sensor receiver.

DETAILED DESCRIPTION

Figure 1A:
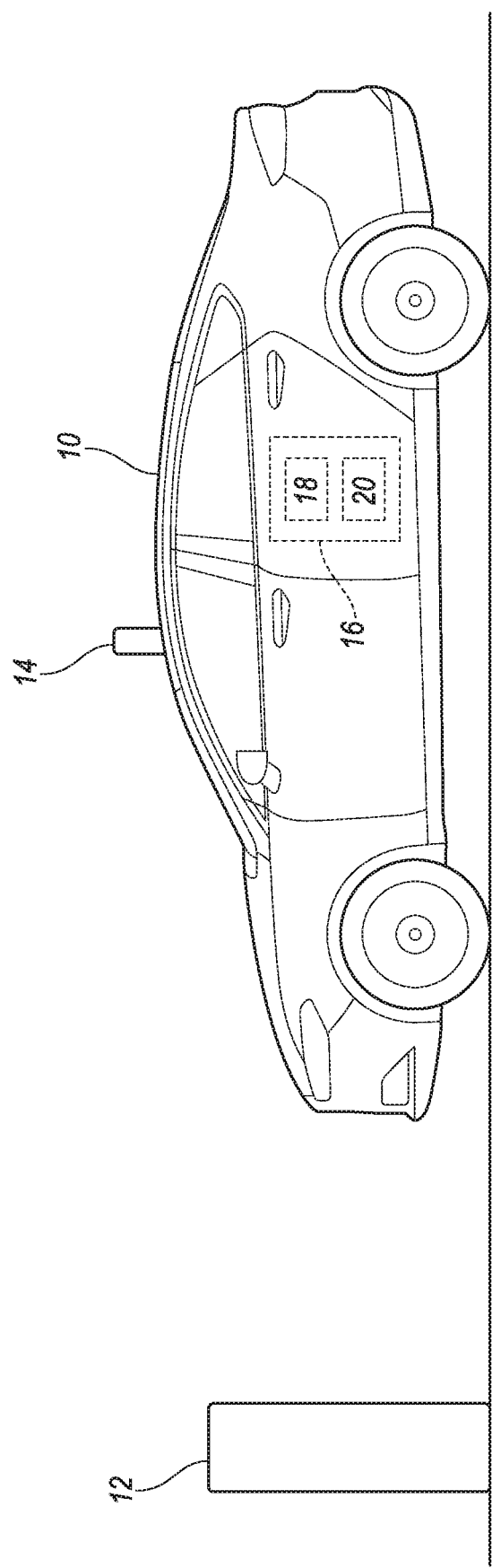
FIG. 1A is a schematic diagram of an example vehicle that includes an object detection sensor.

According to one aspect of the disclosure, a light detection and ranging (LIDAR) sensor includes an optical pulsed transmitter and an optical receiver. The receiver includes a plurality of pixels. Each pixel includes a receiver circuit. Each receiver circuit includes a photosensitive input circuit having at least two terminals, wherein a first terminal is coupled to a detector voltage supply and a second terminal is coupled to a pulse voltage node. Each receiver includes a logarithmic-signal circuit including at least one PN junction, wherein the P-type terminal is coupled to the pulse voltage node and the N-type terminal is coupled to a constant potential.

The LIDAR sensor may include an impedance-reducing circuit electrically coupled to the photosensitive input circuit and to the logarithmic-signal circuit, the impedance-reducing circuit including at least a common-gate transistor coupled to the pulse voltage node. The impedance-reducing circuit may include a bias transistor wherein the bias transistor provides DC bias current to the common-gate transistor. The LIDAR sensor may include a common-mode noise-rejection circuit that includes a capacitor coupled between the gate of the common-gate transistor and the detector voltage supply and adapted to reject common-mode noise on the detector voltage supply. The common-mode noise-rejection circuit may include a selectively-actuatable switch coupled between the gate of the common-gate transistor and a reference voltage, wherein the switch is in a closed position, when no photocurrent pulse is expected and wherein the switch is in an open position, when a photocurrent pulse is expected. The LIDAR sensor may include a bypass circuit electrically coupled to the logarithmic-signal circuit and including at least a bypass transistor having a terminal coupled to the pulse voltage node, wherein, the bypass circuit is adapted to reduce the bias current delivered to the logarithmic-signal circuit. The LIDAR sensor may include a servo loop circuit including an amplifier having a first and a second input and an output, wherein the first amplifier input is coupled to the pulse voltage node, the second amplifier input is a reference voltage, and the amplifier output is coupled to the gate of the bypass transistor of the bypass circuit and adapted to control the current at the logarithmic-signal circuit. The LIDAR sensor may include a servo loop circuit including an amplifier having a first and a second input and an output, wherein the first amplifier input is coupled to the pulse voltage node, the second amplifier input is a reference voltage, and the amplifier output is coupled to the gate of the bias transistor of the impedance-reducing circuit.

The LIDAR sensor may include a linear-signal circuit including a resistor coupled between the pulse voltage node and a constant potential. The LIDAR sensor may include a square-root-signal circuit including a transistor including a first terminal coupled to the pulse voltage node and a second terminal coupled to a constant potential. The source of the transistor of the square-root-signal circuit may be coupled to the pulse voltage node, the drain of the transistor may be coupled to a constant potential, and the gate of the transistor may be coupled to a control voltage. A photocurrent may predominantly flow: through the linear-signal circuit when the photocurrent is less than a first threshold; through the square-root-signal circuit when the photocurrent is greater than the first threshold and less than a second threshold; and through the logarithmic-signal circuit when the photocurrent is greater than the second threshold.

The LIDAR sensor may include an analog memory circuit coupled to the pulse voltage node, wherein the analog memory circuit includes a plurality of sequentially selected capacitive circuits which store voltage samples of a return pulse received by the photosensitive input circuit, wherein each of the plurality of sequentially selected capacitive circuits is readable by a computer.

The LIDAR sensor may include an adjustable low-pass filter circuit coupled to the pulse voltage node, wherein the bandwidth of the filter circuit is adjusted by a computer control output. The bandwidth of the filter circuit may be varied by adjusting a resistance value.

The LIDAR sensor may include a computer including a digital processor and digital memory storing instructions executable by the digital processor to determine a range associated with a return pulse by: selecting and actuating each of a plurality of capacitive circuits, wherein the plurality of capacitive circuits is coupled to the photosensitive input circuit via the pulse voltage node; and wherein the actuation includes moving a switch from an open position to a closed position and to the open position again; and thereafter, reading a voltage stored in each of the capacitive circuits.

According to another aspect of the disclosure, a light detection and ranging (LIDAR) sensor includes an optical pulsed transmitter and an optical receiver. The receiver includes a plurality of pixels, wherein each pixel includes a receiver circuit. Each receiver circuit includes a photosensitive input circuit having at least two terminals, wherein a first terminal is coupled to a detector voltage supply and a second terminal is coupled to a pulse voltage node. Each receiver circuit includes a logarithmic-signal circuit including at least one PN junction, wherein the P-type terminal is coupled to the pulse voltage node and the N-type terminal is coupled to a constant potential. Each receiver circuit includes a linear-signal circuit, including a resistor coupled between the pulse voltage node and a constant potential. Each receiver circuit includes a square-root-signal circuit including a transistor including a first terminal coupled to the pulse voltage node and a second terminal coupled to a constant potential.

According to another aspect of the disclosure, a light detection and ranging (LIDAR) sensor includes an optical pulsed transmitter and an optical receiver. The receiver includes a plurality of pixels, wherein each pixel includes a receiver circuit. Each receiver circuit includes a photosensitive input circuit having at least two terminals, wherein one terminal is coupled to a detector voltage supply and the other terminal is coupled to a pulse voltage node. Each receiver circuit includes a logarithmic-signal circuit including a PN junction, wherein the P-type terminal is coupled to the pulse voltage node and the N-type terminal is coupled to a constant potential. Each receiver circuit includes a linear-signal circuit including a resistor coupled between the pulse voltage node and a constant potential. Each receiver circuit includes a square-root-signal circuit including a transistor including a first terminal coupled to the pulse voltage node and a second terminal coupled to a constant potential. Each receiver circuit includes an impedance-reducing circuit coupled to the photosensitive input circuit, the linear-signal circuit, the square-root-signal circuit, and the logarithmic-signal circuit, wherein the impedance-reducing circuit includes a common-gate transistor coupled to the pulse voltage node, and a bias transistor providing DC bias current to the common-gate transistor.

The LIDAR sensor may include a common-mode noise-rejection circuit that includes a capacitor coupled between the gate of the common-gate transistor and the detector voltage supply and adapted to reject common-mode noise on the detector voltage supply.

The LIDAR sensor may include a servo loop circuit including an amplifier having a first and a second input and an output, wherein the first amplifier input is coupled to the pulse voltage node, the second amplifier input is a reference voltage, and the amplifier output is coupled to the gate of the bias transistor of the impedance-reducing circuit.

The LIDAR sensor may include a current pulse injection circuit coupled to the pulse voltage node, wherein the current pulse injection circuit is adapted to provide a test of functionality or performance.

According to the at least one example, a computer is disclosed that is programmed to execute any combination of the examples set forth above.

According to the at least one example, a computer is disclosed that is programmed to execute any combination of the examples of the method(s) set forth above.

According to the at least one example, a computer program product is disclosed that includes a computer readable medium storing instructions executable by a computer processor, wherein the instructions include any combination of the instruction examples set forth above.

According to the at least one example, a computer program product is disclosed that includes a computer readable medium that stores instructions executable by a computer processor, wherein the instructions include any combination of the examples of the method(s) set forth above.

Various examples of a receiver circuit for a sensor are described. According to a non-limiting example, the sensor is a light detection and ranging (LIDAR) sensor; accordingly, the receiver circuit thereof receives and processes reflected light pulses emitted by the sensor so that a range between the sensor and an object may be determined. The examples of the receiver circuit improve the dynamic range of the receiver thereby allowing accurate range determination over a wide range of incident optical power.

In the present context and throughout the specification, "coupled to" means "electrically coupled directly to" or "electrically coupled indirectly to." "Electrically coupled directly to" means that given two electrical components, there are no electrical components therebetween—only electrical conductors, e.g., wires, traces, etc. And "electrically coupled indirectly to" means that given two electrical components, an electrical path exists between the two electrical components wherein one or more electrical components, e.g., resistor, switch, transistor, etc., may be connected along the path and therebetween.

FIG. 1A is a schematic view of an example vehicle 10 and an object 12. The vehicle 10 shown in the FIG. 1 is a passenger automobile comprising at least one computer 16 and an object detection sensor 14; collectively used to detect the object 12. However, as other examples, the vehicle 10 may be of any suitable manned or unmanned vehicle including a truck, motorcycle, plane, satellite, drone, watercraft, robot, etc. The object 12 may be a moving or stationary object such as another vehicle, pedestrian, vegetation, building, etc., located outside the vehicle 10.

The computer 16 may include any suitable computing device programmed to operate the sensor 14 and/or other vehicle components. In at least one example, computer 16 includes a processor 18 and memory 20. The processor 18 and the memory 20 are digital. Non-limiting examples of processor 18 include a microprocessor, a microcontroller or controller, an application specific integrated circuit (ASIC), a field-programmable gate array (FPGA), one or more electrical circuits comprising discrete digital and/or analog electronic components arranged to perform predetermined tasks or instructions, etc.

Memory 20 may include any non-transitory computer usable or readable medium, which may include one or more storage devices or articles. Exemplary non-transitory computer usable storage devices include conventional hard disk, solid-state memory, random access memory (RAM), read-only memory (ROM), erasable programmable read-only memory (EPROM), electrically erasable programmable read-only memory (EEPROM), as well as any other volatile or non-volatile media. Non-volatile media include, for example, optical or magnetic disks and other persistent memory, and volatile media, for example, also may include dynamic random-access memory (DRAM). These storage devices are non-limiting examples; e.g., other forms of computer-readable media exist and include magnetic media, compact disc ROM (CD-ROMs), digital video disc (DVDs), other optical media, any suitable memory chip or cartridge, or any other medium from which a computer can read. In general, memory 20 may store one or more computer program products which may be embodied as software, firmware, or other programming instructions executable by the processor 18.

Computer 16 may include other hardware elements (not shown) such as an analog-to-digital converter (ADC), digital-to-analog converter (DAC) and one or more discrete circuits for controlling or otherwise enabling various switches or the like in electronic circuits of sensor 14. In one example, the sensor 14 may include the computer 16, e.g., the computer 16 physically located within a housing of sensor 14. In another example, the computer 16 may be a component distinct from the sensor 14 and located at any suitable location in the vehicle 10.

While not portrayed in the illustrations, sensor 14 and computer 16 may be communicatively coupled via any suitable wired and/or wireless communication network (e.g., in vehicle 10)—e.g., permitting computer 16 to send and/or receive instructions and/or data between it, vehicle 10 components, and/or sensor 14.

Figure 1B:
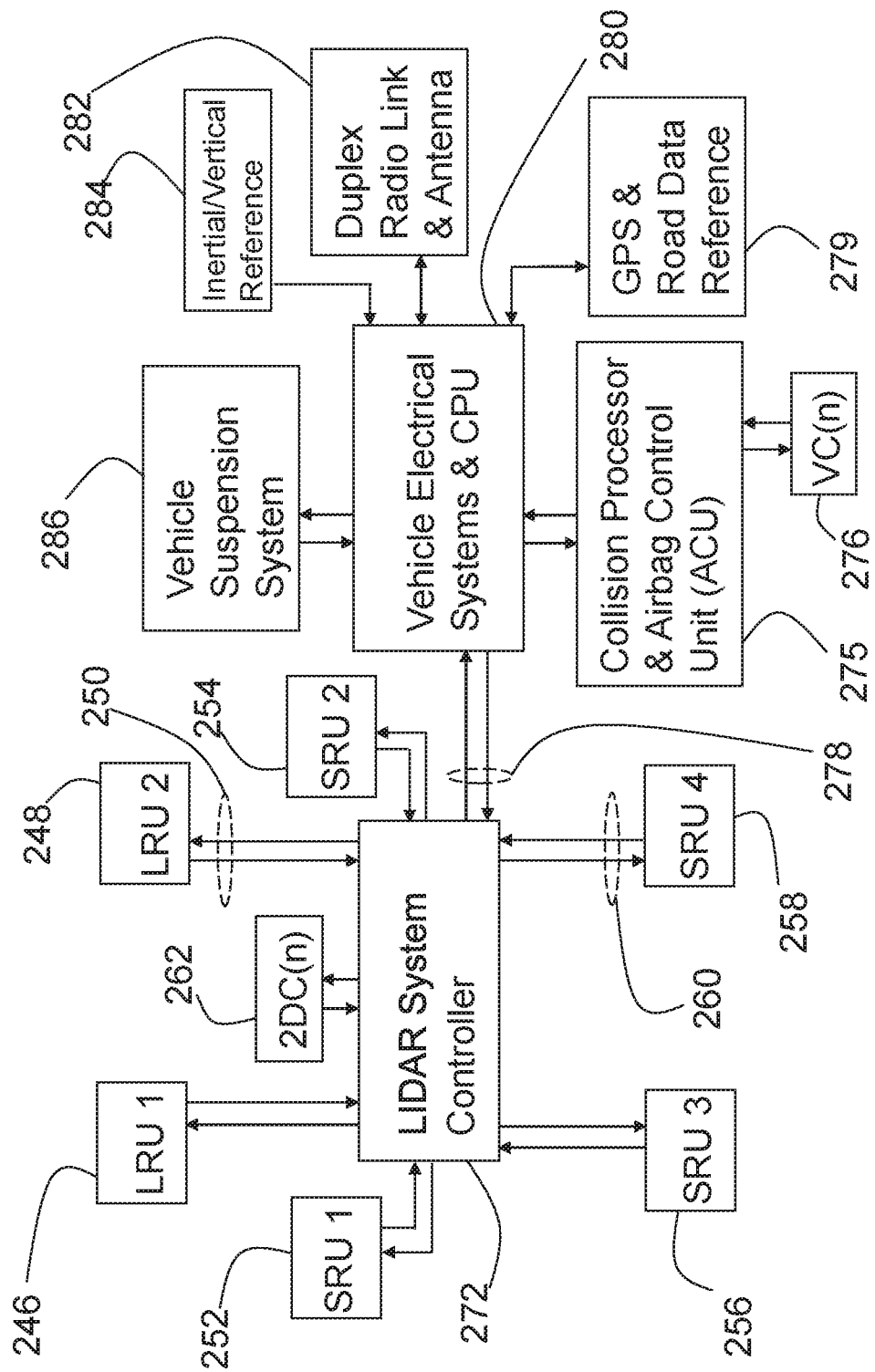
FIG. 1B is an example block diagram showing functional blocks of electrical systems of the vehicle of FIG. 1A.

FIG. 1B is a system block diagram showing the relationship and connections of the major functional blocks of the vehicle electrical systems and central processing unit (CPU) with the LIDAR sensor system. A LIDAR system controller 272 communicates with all of the LIDAR sensors 14 mounted on the vehicle 10. In an example installation, two long-range units, LRU 1 246 and LRU 2 248 connect to LIDAR system controller 272 through a set of bidirectional electrical connections 250. The electrical connections may also have an optical waveguide and optical transmitters and receivers to transfer data, control, and status signals bidirectionally between long-range LIDAR sensors 246, 248 and LIDAR system controller 272. LIDAR system controller 272 also communicates with the four short-range units, SRU 1 252, SRU 2 254, SRU3 256, and SRU4 258, each through a set of bidirectional electrical connections 260. The electrical connections may also have an optical waveguide and optical transmitters and receivers to transfer data, control, and status signals bidirectionally between short-range LIDAR sensors 252-258 and LIDAR system controller 272. Each of the LIDAR sensors may include data processors to reduce the processing load; for example, developing the point cloud and isolating/segmenting objects in the field of view and object speed from the point cloud. Conventional 2D visible light or infrared viewing cameras 262 may be embedded within the LIDAR sensor subsystem and may be part of a sub-assembly containing a LIDAR sensor. These cameras 262 may share the same connections 250 or 260 to the LIDAR system controller 272. A number (n) of other visible light 2D still or video cameras 276 may connect directly to the vehicle collision processor 275 and produce scene data complementary to the 3D data generated by the various LIDAR sensors mounted to the vehicle. The 2D still or video cameras 276 may also operate at either visible or infrared wavelengths. The fields of view of the 2D still or video cameras 276 may be designed to overlap the fields of view of the LIDAR sensors (246, 248, and 252-258) installed on the vehicle 10. Bidirectional electrical connections 278 also serve to transfer 3D data maps, status, and control signals between LIDAR system controller 272 and the vehicle electrical systems and central processing unit (CPU) 280. At the core of the vehicle 10, an electronic brain may control all functioning of the vehicle 10, and typically controls all other subsystems and co-processors. The electronic brain, or central processing unit (CPU 280) is here lumped together with the basic electrical systems of the vehicle, including battery, headlights, wiring harness, etc. Additionally or alternatively, computer 16, as shown in FIG. 2 is a central computer of the vehicle 10. The vehicle suspension system 286 receives control commands and returns status through bidirectional electrical connections, and is capable of modifying the ride height, spring rate, and damping rate of each of the vehicle's wheels independently. An inertial reference 284 also has a vertical reference, or gravity sensor as an input to the CPU 280. A global positioning system (GPS) reference 279 may also be connected to the vehicle CPU 280. The GPS reference 279 may also have a database of all available roads and conditions in the area which may be updated periodically through a wireless link. A duplex radio link 282 may also be connected to CPU 280 and may communicate directly with other vehicles in close range, sharing position, speed, direction, and vehicle specific information to facilitate collision avoidance and the free flow of traffic. The duplex radio link may also receive local positional references, road data, weather conditions, and other information important to the operations of the vehicle 10 from a central road conditions database through roadside antennas or cellular stations. The vehicle 10 may also provide vehicle status and road conditions updates to the central road conditions database via radio uplink 282, allowing the central road conditions database to be augmented by any and all vehicles which are equipped with LIDAR sensors and a radio link 282. A collision processor and airbag control unit (ACU) 275 connects bidirectionally to CPU 280 as well, receiving inputs from a number of accelerometers, brake sensors, wheel rotational sensors, LIDAR sensors, etc. ACU 275 makes decisions on the timing and deployment of airbags and other restraints. Though the system of FIG. 1B is shown with the vehicle 10 on which the system is nominally installed, and which is typically an automobile, the system, and any of the described components and subsystems are designed to be installed on any number of moving vehicles which may be actively piloted, semi-autonomously navigated, or fully autonomously steered and controlled, and which may be manned or unmanned, including planes, trains, automobiles, motorcycles, helicopters, boats, ships, spacecraft, hovercraft, airships, jeeps, trucks, robotic crawlers, gliders, utility vehicles, street sweepers, submersibles, amphibious vehicles, and sleds.

Figure 1C:
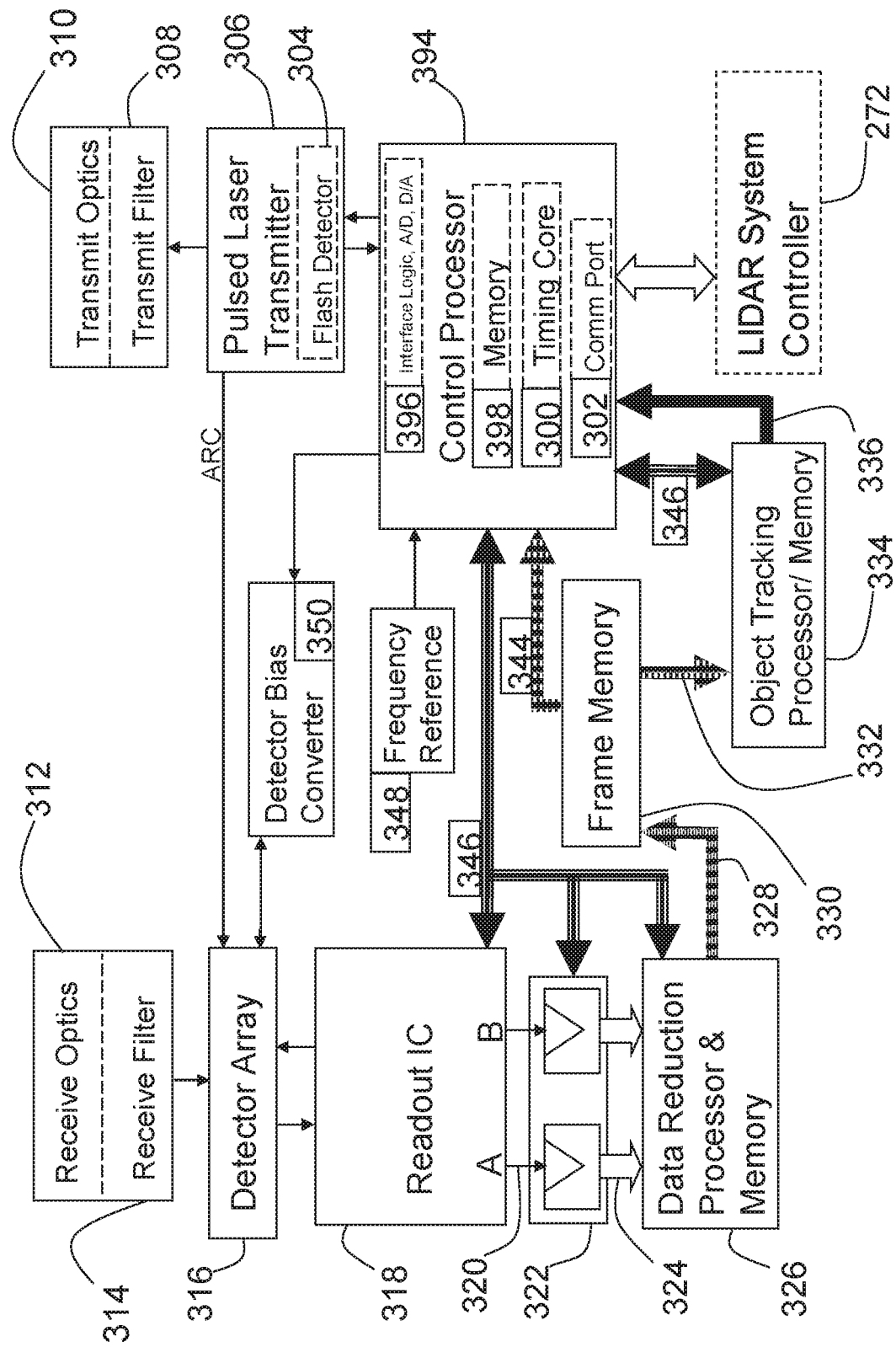
FIG. 1C is an example block diagram of a LIDAR sensor.

FIG. 1C is a block diagram of a LIDAR sensor which describes both long-range LIDAR sensors 246, 248 and short-range LIDAR sensors 252-258 typical of the preferred embodiment. Adaptations of the pulsed laser transmitter 306, transmit optics 310, receive optics 312, and in some cases, programmable changes to the sampling circuitry of readout integrated circuit 318 may be effected to provide range enhancement, wider or narrower field of view, and reduced size and cost. The first embodiment provides a 128×128 or 128×64 detector array 316 of light detecting elements situated on a single insulating sapphire substrate which is stacked atop a readout integrated circuit 318 using a hybrid assembly method. In other embodiments of the design, M×N focal plane arrays of light detecting elements with M and N having values from 2 to 1024 and greater are anticipated. The functional elements depicted in FIG. 1C may first be described with respect to the elements of a typical long-range LIDAR sensor 246. A control processor 394 controls the functions of the major components of the LIDAR sensor 246. Control processor 394 connects to pulsed laser transmitter 306 through bidirectional electrical connections (with interface logic, analog to digital (A/D) and digital to analog (D/A) converters 396) which transfer commands from control processor 394 to pulsed laser transmitter 306 and return monitoring signals from pulsed laser transmitter 306 to the control processor 394. The interface logic, including analog to digital (A/D) and digital to analog (D/A) converters 396, may reside completely or in part on the readout integrated circuit 318. A light sensitive diode detector (Flash Detector) 304 is placed at the back facet of the laser so as to intercept a portion of the laser light pulse produced by the pulsed laser transmitter 306. An optical sample of the outbound laser pulse taken from the front facet of pulsed laser transmitter 306 is routed to a corner of the detector array 316 as an automatic range correction (ARC) signal, typically over a fiber optic cable. The pulsed laser transmitter 306 may be a solid-state laser, monoblock laser, semiconductor laser, fiber laser, or an array of semiconductor lasers. It may also employ more than one individual laser to increase the data rate. In a preferred embodiment, pulsed laser transmitter 306 is an array of vertical cavity surface emitting lasers (VCSELs). In an alternative embodiment, pulsed laser transmitter 306 is a disc-shaped solid-state laser of erbium-doped phosphate glass pumped by 976 nanometer semiconductor laser light.

In operation, the control processor 394 initiates a laser illuminating pulse by sending a logic command or modulation signal to pulsed laser transmitter 306, which responds by transmitting an intense burst of laser light through transmit filter 308 and transmit optics 310. In the case of a Q-switched solid-state laser based on erbium glass, neodymium-YAG, or other solid-state gain medium, a simple bi-level logic command may start the pump laser diodes emitting into the gain medium for a period of time which will eventually result in a single flash of the pulsed laser transmitter 306. In the case of a semiconductor laser which is electrically pumped, and may be modulated instantaneously by modulation of the current signal injected into the laser diode, a modulation signal of a more general nature is possible, and may be used with major beneficial effect. The modulation signal may be a flat-topped square or trapezoidal pulse, or a Gaussian pulse, or a sequence of pulses. The modulation signal may also be a sinewave, gated or pulsed sinewave, chirped sinewave, or a frequency-modulated (FM) sinewave, or an amplitude-modulated (AM) sinewave, or a pulse-width-modulated (PWM) series of pulses. The modulation signal is typically stored in on-chip memory 398 as a lookup table of digital memory words representative of analog values; this lookup table is read out in sequence by control processor 394 and converted to analog values by an onboard digital-to-analog (D/A) converter 396, and passed to the pulsed laser transmitter 306 driver circuit. The combination of a lookup table stored in memory 398 and a D/A converter, along with the necessary logic circuits, clocks, and timers 300 resident on control processor 394, together comprise an arbitrary waveform generator (AWG) circuit block. The AWG circuit block may alternatively be embedded within a laser driver as a part of pulsed laser transmitter 306. Transmit optics 310 diffuse the high-intensity spot produced by pulsed laser transmitter 306 substantially uniformly over the desired field of view to be imaged by the LIDAR sensor 246. Transmit filter 308 acts to constrain the laser light output to the design wavelength, removing any spurious emissions outside the design wavelength of the pulsed laser transmitter 306. An optical sample of the transmitted laser pulse, (termed an ARC signal) is also sent to the detector array 316 via optical fiber. A few pixels in a corner of detector array 316 are illuminated with the ARC signal, which establishes a zero time reference for the timing circuits in the readout integrated circuit (ROIC) 318. Each unit cell of the readout integrated circuit 318 has an associated timing circuit which is started counting by an electrical pulse derived from the ARC signal. Alternatively, the flash detector 304 signal may be used as a zero reference in a second timing mode. Though the ARC signal neatly removes some of the variable delays associated with transit time through the detector array 316, this results in additional cost and complexity. Given digital representations of the image frames, the same task may be handled in software/firmware by a capable embedded processor such as data reduction processor 326. When some portion of the transmitted laser pulse is reflected from a feature in the scene in the field of view of the LIDAR sensor 246, it may be incident upon receive optics 312, typically comprising the lens of a headlamp assembly and an array of microlenses atop detector array 316. Alternative embodiments use enhanced detectors which may not require the use of microlenses. Other alternative embodiments of receive optics 312 employ diffractive arrays to collect and channel the incoming light to the individual elements of detector array 316. Pulsed laser light reflected from a feature in the scene in the field of view of receive optics 312 is collected, filtered through receive filter 314, and focused onto an individual detector element of the detector array 316. This reflected laser light optical signal is then detected by the affected detector element and converted into an electrical current pulse which is then amplified by an associated unit cell electrical circuit of the readout integrated circuit 318, and the time of flight measured. Thus, the range to each reflective feature in the scene in the field of view is measurable by the LIDAR sensor 246. Transmit optics 310 consisting of a spherical lens, cylindrical lens, holographic diffuser, diffractive grating array, or microlens array condition the output beam of the pulsed laser transmitter 306 into a proper conical, elliptical, or rectangular shaped beam for illuminating a central section of a scene or objects in the path of vehicle 10, as illustrated in FIG. 1A.

Continuing with FIG. 1C, receive optics 312 may be a convex lens, spherical lens, cylindrical lens or diffractive grating array. Receive optics 312 collect the light reflected from the scene and focus the collected light on the detector array 316. Receive filter 314 restricts the incoming light to the proper wavelength band associated with the transmitter of the same LIDAR sensor 246. In a preferred embodiment, detector array 316 is formed in a thin film of indium gallium arsenide deposited epitaxially atop an indium phosphide semiconducting substrate. Typically, detector array 316 would have a set of cathode contacts exposed to the light and a set of anode contacts electrically connected to the supporting readout integrated circuit 318 through a number of indium bumps deposited on the detector array 316. The cathode contacts of the individual detectors of detector array 316 would then be connected to a high-voltage detector bias grid on the illuminated side of the array. Each anode contact of the detector elements of detector array 316 is thus independently connected to an input of a unit cell electronic circuit of readout integrated circuit 318. This traditional hybrid assembly of detector array 316 and readout integrated circuit 318 may still be used, but new technology may reduce inter-element coupling, or crosstalk, and reduce leakage (dark) current and improve efficiency of the individual detector elements of detector array 316. In a preferred embodiment, the elements of detector array 316 may be formed atop a substantially monocrystalline sapphire wafer. Silicon-on-sapphire (SOS) substrates with a thin layer of substantially monocrystalline silicon grown epitaxially thereon are available in the marketplace, and are well known for their superior performance characteristics. Germanium and silicon-germanium detectors are also compatible with monolithic silicon integrated circuit processes and may alternatively be employed. A detector array 316 of APD, PIN, or PN junction detectors may be formed of a sequence of layers of p-type and n-type silicon via epitaxial regrowth on the SOS wafers. Boron and aluminum may be used as dopants for any of the p-type silicon epitaxial layers. Phosphorus, arsenic, and antimony may be used as dopants for any of the n-type silicon epitaxial layers. Sapphire substrates with a thin layer of epitaxially grown monocrystalline gallium nitride are also available in the marketplace (gallium nitride on sapphire, or GNOS), and are widely known as substrates well suited to the fabrication of high brightness blue LEDs. A detector array 316 of APD, PIN, or PN junction detectors may be formed of a sequence of layers of p-type and n-type gallium nitride (GaN) or indium gallium nitride (InGaN) via epitaxial regrowth on the GNOS wafers. Silicon and germanium may be used as dopants for any of the n-type GaN layers. In some cases, magnesium may be used as a dopant for p-type layers in GaN. In a further development, detector array 316 may be fabricated monolithically directly atop readout IC 318. Detector array 316 may also be formed in a more conventional manner from compounds of indium gallium arsenide, indium aluminum arsenide, silicon carbide, diamond, mercury cadmium telluride, zinc selenide, or other well-known semiconductor detector materials. Readout integrated circuit 318 comprises a rectangular array of unit cell electrical circuits. Each unit cell or pixel has the capability of receiving a photocurrent pulse generated by an optoelectronic detector element of detector array 316, converting this photocurrent pulse into a voltage pulse and sampling this voltage pulse. Typically, the unit cell is also capable of detecting the presence of an electrical pulse associated with a light pulse reflected from the scene and intercepted by the detector element of detector array 316. The detector array 316 may be an array of avalanche photodiodes, capable of photoelectron amplification, and modulated by an incident light signal at the design wavelength. The detector array 316 elements may also be a P-intrinsic-N design or N-intrinsic-P design with the dominant carrier being holes or electrons, respectively; in which case the corresponding ROIC 318 would have the polarity of the bias voltages and amplifier inputs adjusted accordingly. The hybrid assembly of detector array 316 and readout integrated circuit 318 of the preferred embodiment is mounted to a supporting circuit assembly, typically on a FR-4 substrate or ceramic substrate. The circuit assembly typically provides support circuitry which supplies conditioned power, a reference clock signal, calibration constants, and selection inputs for the readout column and row, among other support functions, while receiving and registering range and intensity outputs from the readout integrated circuit 318 for the individual elements of the detector array 316. Many of these support functions may be implemented in Reduced Instruction Set Computer (RISC) processors which reside on the same circuit substrate. A detector bias converter circuit 350 applies a time-varying detector bias to the detector array 316 which provides optimum detector bias levels to reduce the hazards of saturation in the near field of view of detector array 316, while maximizing the potential for detection of distant objects in the field of view of detector array 316. The contour of the time-varying detector bias supplied by detector bias converter 350 is formulated by control processor 394 based on feedback from the data reduction processor 326, indicating the reflectivity and distance of objects or points in the scene in the field of view of the detector array 316. Control processor 394 also provides several clock and timing signals from a timing core 300 to readout integrated circuit 318, data reduction processor 326, analog-to-digital converters 322, object tracking processor 334, and their associated memories. Control processor 394 relies on a temperature-stabilized or temperature-compensated frequency reference 348 to generate a variety of clocks and timing signals. Temperature-stabilized frequency reference 348 may be a temperature-compensated crystal oscillator (TCXO), dielectric resonator oscillator (DRO), or surface acoustic wave device (SAW). Timing core 300 resident on control processor 394 may include a high-frequency tunable oscillator, programmable pre-scaler dividers, phase comparators, and error amplifiers.

Continuing with FIG. 1C, control processor 394, data reduction processor 326, and object tracking processor 334 each have an associated memory for storing programs, data, constants, and the results of operations and calculations. These memories, each associated with a companion digital processor, may include ROM, EPROM, or other non-volatile memory such as flash. They may also include a volatile memory such as SRAM or DRAM, and both volatile and non-volatile memory may be integrated into each of the respective processors. A common frame memory 330 serves to hold a number of frames, each frame being the image resulting from a single laser transmission sequence. A laser transmission sequence may be a single pulse, or a sequence of pulses, depending on the laser type employed. The operational mode in a preferred embodiment using a single laser illuminating pulse is described in this section. Both data reduction processor 326 and object tracking processor 334 may perform 3D image processing to reduce the load on a scene processing unit (not shown) normally associated with LIDAR system controller 272. There are two modes of data collection, the first being SULAR, or a progressive scan in depth. Each laser pulse typically results in 20 "slices" of data, similar to a CAT scan, and each "slice" may be stored as a single page in the common frame memory 330. With each pixel sampling at a 2 nanosecond interval, the slices are each a layer of the image space at roughly 1 foot differences in depth. The 20 slices represent a frame of data, and the sampling for a succeeding laser pulse may be started at 20 feet further in depth, so that the entire image space up to 1000 feet in range or depth may be swept out in a succession of 50 laser pulses. In some cases, the frame memory may be large enough to hold all 50 frames of data. The number of slices stored could be enough to map out any relevant distance, with no trigger mode operation required. The reduction of the data might then take place in an external computer, as in the case of data taken to map an underwater surface, or a forest with tree cover, or any static landscape, where sophisticated post-processing techniques in software may yield superior accuracy or resolution. A second data acquisition mode is the TRIGGER mode, where the individual pixels each look for a pulse response, and upon a certain pulse threshold criteria being met, the 20 analog samples bracketing the pulse time of arrival are retained in the pixel analog memories, and a running digital counter is frozen with a nominal range measurement. The 20 analog samples are output from each pixel through the "A" and "B" outputs 320 of readout integrated circuit 318. The "A" and "B" outputs 320 are analog outputs, and the analog samples presented there are converted to digital values by the dual-channel analog-to-digital (A/D) converter 322. Larger detector arrays 316 and readout ICs 318 may have more than two analog outputs. The digital outputs 324 of the A/D converters 322 connect to the inputs of the data reduction processor 326. A/D converters 322 may also be integrated into readout integrated circuit 318. The digital outputs are typically 10- or 12-bit digital representations of the uncorrected analog samples measured at each pixel of the readout IC 318, but other representations with greater or fewer bits may be used, depending on the application. The rate of the digital outputs depends upon the frame rate and number of pixels in the array. In TRIGGER mode, a great deal of data reduction has already transpired, since the entire range or depth space may be swept out in the timeframe of a single laser pulse, and the data reduction processor 326 would only operate on the 20 analog samples stored in each unit cell in order to refine the nominal range measurement received from each pixel (unit cell) of the array. The data reduction processor 326 refines the nominal range measurements received from each pixel by curve fitting of the analog samples to the shape of the outgoing laser illuminating pulse, which is preserved by the reference ARC pulse signal. These pulses are typically Gaussian, but may be square, trapezoidal, haversine, sine function, etc., and the fitting algorithms may employ Fourier analysis, Least Squares analysis, or fitting to polynomials, exponentials, etc. The range measurements may also be refined by curve fitting to a well-known reference pulse characteristic shape. In TRIGGER acquisition mode, the frame memory 330 only needs to hold a "point cloud" image for each illuminating laser pulse. The term "point cloud" refers to an image created by the range and intensity of the reflected light pulse as detected by each pixel of the pixel array. In TRIGGER mode, the data reduction processor 326 serves mostly to refine the range and intensity (R&I) measurements made by each pixel prior to passing the R&I data to the frame memory 330 over data bus 328, and no "slice" data or analog samples are retained in memory independently of the R&I "point cloud" data in this acquisition mode. Frame memory 330 provides individual or multiple frames, or full point cloud images, to control processor 394 over data bus 344, and to an optional object tracking processor 334 over data bus 332 as required.

Referring to FIG. 1C, data reduction processor 326 and control processor 394 may be of the same type, a reduced instruction set (RISC) digital processor with hardware implementation of integer and floating-point arithmetic units. Object tracking processor 334 may also be of the same type as RISC processors 326 and 394, but may in some cases be a processor with greater capability, suitable for highly complex graphical processing. Object tracking processor 334 may have, in addition to hardware implemented integer and floating-point arithmetic units, a number of hardware implemented matrix arithmetic functions, including but not limited to; matrix determinant, matrix multiplication, and matrix inversion. In operation, the control processor 394 controls readout integrated circuit 318, A/D converters 322, frame memory 330, data reduction processor 326 and object tracking processor 334 through a bidirectional control bus 346 which allows for the control processor 394 to pass commands on a priority basis to the dependent peripheral blocks; readout IC 318, A/D converters 322, frame memory 330, data reduction processor 326, and object tracking processor 334. Bidirectional control bus 346 also serves to return status and process parameter data to control processor 394 from readout IC 318, A/D converters 322, frame memory 330, data reduction processor 326, and object tracking processor 334. Data reduction processor 326 refines the nominal range data and adjusts each pixel intensity data developed from the digitized analog samples received from A/D converters 322, and outputs a full image frame via unidirectional data bus 328 to frame memory 330, which is a dual-port memory having the capacity of holding several frames to several thousands of frames, depending on the application. Object tracking processor 334 has internal memory with sufficient capacity to hold multiple frames of image data, allowing for multi-frame synthesis processes, including video compression, single-frame or multi-frame resolution enhancement, statistical processing, and object identification and tracking. The outputs of object tracking processor 334 are transmitted through unidirectional data bus 336 to a communications port 302, which may be resident on control processor 394. All slice data, range and intensity data, control, and communications then pass between communications port 302 and a centralized LIDAR system controller 272 through bidirectional connections 350. Power and ground connections (not shown) may be supplied through an electromechanical interface. Bidirectional connections 350 may be electrical or optical transmission lines, and the electromechanical interface may be a DB-25 electrical connector, or a hybrid optical and electrical connector, or a special automotive connector configured to carry signals bidirectionally for the LIDAR sensor 246. Bidirectional connections 260 (see FIG. 1B) would connect to LIDAR system controller 272 for an auxiliary lamp assembly which may have a short-range LIDAR sensor 258 embedded therein. Bidirectional connections 150 (260) may be high-speed serial connections such as Ethernet, Universal Serial Bus (USB), or Fibre Channel, or may also be parallel high-speed connections such as Infiniband, etc., or may be a combination of high-speed serial and parallel connections, without limitation to those listed here. Bidirectional connections 150 (260) also serve to upload information to control processor 394, including program updates for data reduction processor 326, object tracking processor 334, and global position reference data, as well as application-specific control parameters for the remainder of the LIDAR sensor's 246 functional blocks. Inertial and vertical reference 284 (see FIG. 1B) also provides data to the short-range LIDAR sensors 252-258 and long-range LIDAR sensors 246-48 from the host vehicle 10 through the vehicle electrical systems and CPU 280 and the LIDAR system controller 272 as needed. Likewise, any other data from the host vehicle 10, which may be useful to the LIDAR sensor 246, may be provided in the same manner as the inertial and vertical reference data. Inertial and vertical reference data may be utilized in addition to external position references by control processor 394, which may pass position and inertial reference data to data reduction processor 326 for adjustment of range and intensity data, and to object tracking processor 334 for utilization in multi-frame data synthesis processes. The vertical reference commonly provides for measurement of pitch and roll, and is adapted to read out an elevation angle, and a twist angle (analogous to roll) with respect to a horizontal plane surface normal to the force of gravity. The short-range LIDAR sensors 252-258 typically employ a semiconductor laser, which may be modulated in several different ways. The long-range LIDAR sensors 246-248 typically employ a Q-switched solid-state laser, which produces a single output pulse with a Gaussian profile if properly controlled. The pulse shape of a solid-state laser of this type is not easily modulated, and therefore must be dealt with "as is" by the receiver section of a long-range LIDAR sensor 246-248. The operations of short-range LIDAR sensors 252-258 of the type which are typically embedded in an auxiliary lamp assembly such as a taillight, turn signal, or parking light are the same as the operations of the long-range LIDAR sensors 246-248 with some exceptions. The long-range LIDAR sensors 246-248 and short-range LIDAR sensors 252-258 may differ only in the type of laser employed and the type of laser modulation. The transmit optics 310 and receive optics 312 may also differ, owing to the different fields of view for long-range LIDAR sensors 246-248 and short-range LIDAR sensors 252-258. Differences in the transmitted laser pulse modulation between the long-range LIDAR sensors 246-248 and short-range LIDAR sensors 252-258 may be accommodated by the flexible nature of the readout IC 318 sampling modes, and the data reduction processor 326 programmability. The host vehicle 10 may have a number of connector receptacles generally available for receiving mating connector plugs from USB, Ethernet, RJ-45, or other interface connection, and which may alternatively be used to attach long-range LIDAR sensors 246-248 or short-range LIDAR sensors 252-258 of the type described herein.

In a short-range LIDAR sensor 252, considerably less transmit power is required, allowing for the use of a semiconductor laser and multi-pulse modulation schemes. One example of a semiconductor laser is the vertical cavity surface emitting laser (VCSEL), used in a preferred embodiment because of a number of preferential characteristics. A VCSEL typically has a circular beam profile, and has lower peak power densities at the aperture. VCSELs also require fewer secondary mechanical operations, such as cleaving, polishing, etc., and may be formed into arrays quite easily. The use of a semiconductor laser allows for the tailoring of a drive current pulse so as to produce a Gaussian optical pulse shape with only slight deviations. The VCSEL response time is in the sub-nanosecond range, and the typical pulse optical width might be 5-10 nanoseconds at the half power points. In the diagram of FIG. 1C, the VCSEL and laser driver would be part of the pulsed laser transmitter 306, and the desired pulse or waveshape is itself produced by a digital-to-analog converter 396 which has a typical conversion rate of 200-300 MHz, so any deviations in the output pulse shape from the Gaussian ideal may be compensated for in the lookup table in memory 398 associated with control processor 394, which serves as the digital reference for the drive current waveform supplied to the laser driver within pulsed laser transmitter 306 by the D/A converter 396. A Gaussian single-pulse modulation scheme works well at short ranges, given the limited optical power available from a VCSEL. Extending the range of a VCSEL transmitter may be done using more sophisticated modulation schemes such as multi-pulse sequences, sinewave bursts, etc. The VCSEL and modulation schemes as described herein with reference to short-range LIDAR sensor 252 are an alternative to the solid-state laser typically used in a pulsed laser transmitter 306 of a long-range LIDAR sensor 246. The use of a VCSEL array in pulsed laser transmitter 306 has the potential to reduce cost, size, power consumption, and/or enhance reliability. LIDAR sensors may be mounted at many points on the vehicle 10: headlamps, auxiliary lamps, door panels, rear view mirrors, bumpers, etc. When equipped with a more sensitive detector array 316 such as an APD array, SPAD array, or image tube FPA, a LIDAR sensor of the type described herein may use a VCSEL array as an illuminating source, and much longer ranges may be supported. When referring to the major functions of the LIDAR sensor of FIG. 1C, it is sometimes convenient to refer to the "optical transmitter" as those functions which support and/or create the burst of light for illuminating the scene in the field of view. These elements would typically be the control processor 394 which starts the process, pulsed laser transmitter 306, transmit filter 308, and transmit optics 310. The term "optical receiver" may be used to refer to those elements necessary to collect the light reflected from the scene in the field of view, filter the received light, convert the received light into a plurality of pixelated electrical signals, amplify these pixelated electrical signals, detect the pulses or modulation thereon, perform the range measurements, and refine or reduce the received data. These functions would include the receive optics 312, receive filter 314, detector array 316, readout IC 318, A/D converters 322, and the data reduction processor 326.

With reference to FIGS. 1-5, the object detection sensor 14 in the illustrated example may be any suitable light detection and ranging (LIDAR) sensor, e.g., long-range sensor units LRU 1 246 and LRU 2 248, short-range sensor units, SRU 1 252, SRU 2 254, SRU3 256, and SRU4 258. For example, the sensor 14 may be a solid-state sensor (e.g., a flash LIDAR sensor). Sensor 14 may emit pulses of light into the field of illumination, and when an object 12 is within the sensor's field of view, sensor 14 may detect an object 12 based on receiving reflections of light—reflected from object 12.

According to at least the illustrated example in FIG. 2, the sensor 14 includes one or more optical pulsed transmitters 22 (hereinafter "transmitters 22"), e.g., including pulsed laser transmitter 306, transmitter optics 310, etc., and one or more receivers 24 (e.g., including receive optics 312, receive filter 314, detector array 316, readout IC 318). According to one example, each of the transmitters 22 are identical and each of the receivers 24 are identical; therefore, only one of each will be described below.

Transmitter 22 may be any suitable electronically-actuatable device for emitting light. For example, it may be a semiconductor laser such as a vertical-cavity surface-emitting laser (VCSEL), an edge emitting laser diode, or a diode-pumped solid-state laser (DPSSL), to name a few non-limiting examples. The transmitter 22 may be designed to emit a pulsed flash of light (e.g., a pulse beam) according to any suitable power and wavelength, i.e., the transmitter 22 may be a pulsed laser transmitter. According to one example, the pulse beam is in the infrared spectrum; however visible light and ultraviolet light may also be used in some applications.

Receiver 24 may include any suitable electronic device for detecting light transmitted by transmitter 22 and reflected from object 12. With reference to FIGS. 1C and 2, according to one example, receiver 24 includes one or more pixels 26. In the illustrated example receiver 24 includes an array of pixels 26 (see FIG. 2). In at least one example, each pixel 26 may be identical; therefore, only one will be described. Pixel 26 may include a receiver circuit 28, a filter circuit 30, a buffer circuit 32, and an analog memory circuit 34.

Figure 3:
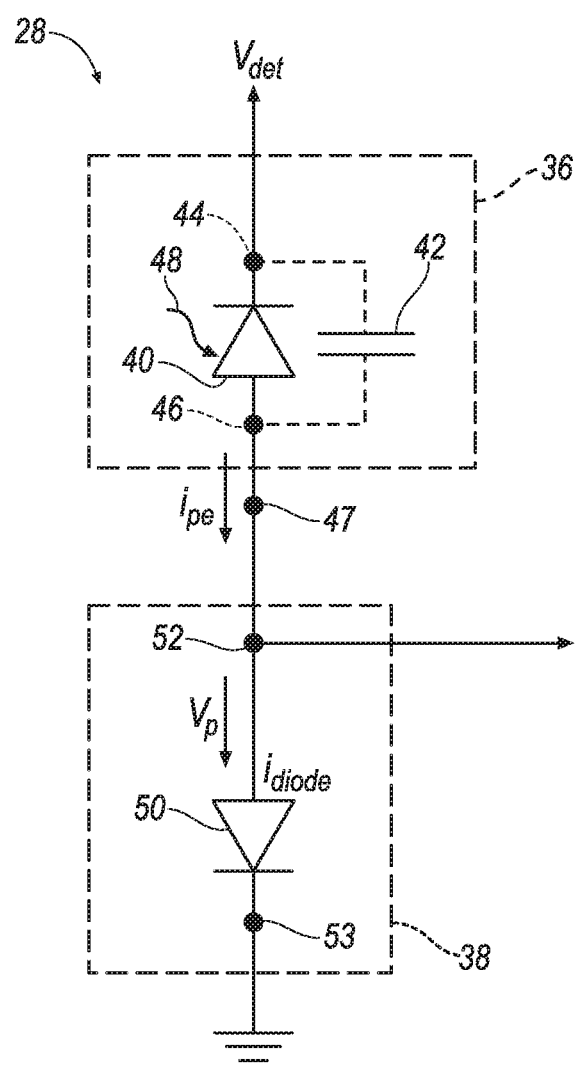
FIG. 3 is an example receiver circuit of the sensor receiver shown in FIG. 2.

In the example illustrated in FIGS. 2-3, the receiver circuit 28 includes a photosensitive input circuit 36 (or photodetector) and a logarithmic-signal circuit 38. The photosensitive input circuit 36 may include a photosensitive element 40 having a built-in capacitance 42 (shown in FIG. 3 as a capacitor coupled in parallel (dashed lines) to element 40). In one example, the photosensitive element 40 is a PIN photodiode, but may be an APD or other type. A photodiode is a semiconductor device designed to convert received light into an electrical current. The photodiode may have attached an optical filter for selecting an incoming wavelength of light. The photodetector may also employ a lens designed to collect and focus incoming light. As alluded to above, capacitor 42 represents built-in capacitance formed in the photodiode solid-state junction. According to an example, the built-in capacitance is typically in the range of 50 to 500 femto-Farads (fF).

In FIG. 3, photosensitive element 40 includes an input 44 coupled to a voltage supply $V_{det}$, e.g., 8 V DC, and an output 46 coupled to a node 47. A light input 48 to the photosensitive element 40 is also shown—thus, when the light input 48 is received at element 40, an electric current $i_{pe}$ is induced at the output 46. The configuration shown enables a photoconductive mode of operation for photodiode 40. The logarithmic-signal circuit 38 may include a forward-biased PN junction, hereinafter referred to as diode 50. An anode (e.g., a p-type terminal of a PN junction) of the forward-biased diode 50 may be coupled to node 47 via a pulse voltage node 52 (node 52 having a voltage $V_p$) (in this example, nodes 46, 47 and 52 are identical). A terminal 53 of the logarithmic-signal circuit 38, e.g., a cathode (e.g., an n-type terminal of a PN junction) of the diode 50, may be coupled to ground. The term "ground" is used in this context to describe a reference point (i.e., having a constant potential) in an electrical circuit from which voltages are measured and which is a common return path for electric current; in some examples receiver circuit 28 may include local and/or global grounds. In at least one example, the logarithmic circuit 38 does not include an amplifier directly coupled to the photosensitive input circuit 36. The receiver circuit 28 may be coupled to the filter circuit 30 via node 52.

Figure 4A:
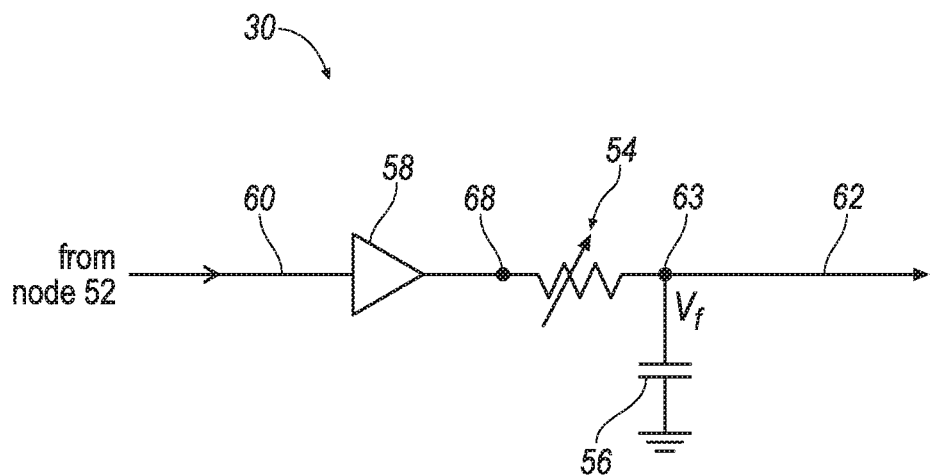
FIGS. 4A-4B are examples of a filter shown in FIG. 2.

Shown in FIG. 4A, filter circuit 30 may be any suitable circuit for filtering undesirable noise from the system. According to one example, filter circuit 30 includes an adjustable low-pass filter. In the present context, "adjustable filter" means having a variable bandwidth. According to the illustrated example, the adjustable low-pass filter circuit 30 includes an optional buffer 58 (e.g., a buffer amplifier) coupled to an RC filter that may include an adjustable resistor circuit 54. In the embodiment shown in the Figures, resistor circuit 54 may be a selectable resistor, but may alternatively be a potentiometer or other adjustable resistor. The adjustable resistor circuit 54 is connected to a first terminal of capacitor 56, and the second terminal of capacitor 56 is connected to a constant potential such as ground. More particularly, an input 60 of filter circuit 30 (and to buffer 58) may be connected to node 52 (voltage $V_p$), and an output of the buffer 58 may be connected to resistor circuit 54 at node 68. An output 62 of the filter circuit 30 is produced at node 63 (voltage $V_f$). In this embodiment node 63 is located between resistor circuit 54 and capacitor 56. Illustrative values of resistor circuit 54 include a resistive range of 1 kohm to 100 kOhms, and illustrative values of capacitor 56 include 10 fF to 100 fF. The buffer 58 (when included in circuit 30) may increase electrical isolation between input node 52 ($V_p$) and filter output $V_f$ at node 63 and may minimize the undesirable reduction of an electrical signal source by a lower impedance load. Buffer amplifier 58 therefore serves the well-known purpose of driving a lower impedance load from a higher impedance source without loss of signal. By adjusting the resistance of resistor circuit 54, filter circuit 30 may adjust a bandwidth of the circuit 30.

Figure 4B:
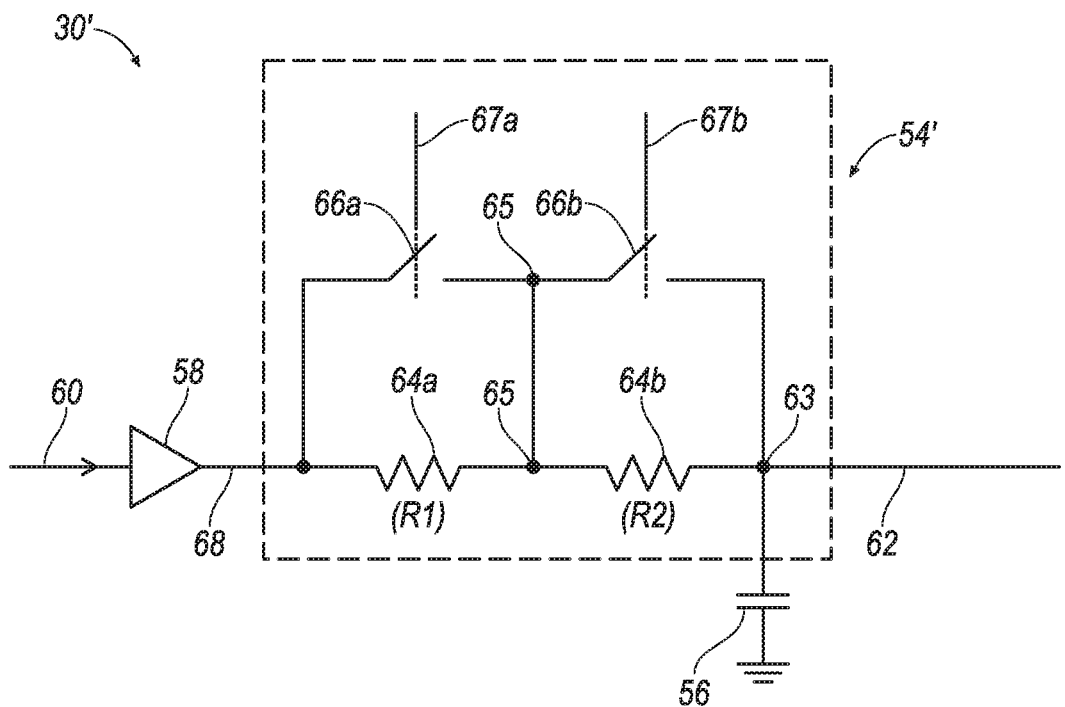

As shown in FIG. 4B, other examples of the filter circuit also exist. For instance, a filter circuit 30' is shown including a resistor circuit 54'; other elements of the filter circuit may be similar or identical to those described with respect to FIG. 4A (thus, they will not be re-described here).

Resistor circuit 54' may include a first resistor 64a connected in parallel with a first bypass switch 66a and a second resistor 64b connected in parallel with a second bypass switch 66b. Resistors 64a, 64b and switches 66a, 66b each are connected to one another at node 65. Switches 66a, 66b may be selectively actuated via an electronic control unit or computer (e.g., including but not limited to computer 16) to control resistance and thereby control the bandwidth of the filter circuit 30'. Switch 66a is controlled by an electrical input 67a, and switch 66b is controlled by a control input 67b. Consider for example the illustrative total resistances of filter circuit 30' (shown in Table I), wherein the resistance of resistor 64a is represented as "R1" and wherein the resistance of resistor 64b is represented as "R2." The resistance of switches 66a and 66b when closed is Rs and is normally much lower than R1 and R2. According to at least one example, R1 may be 15 kOhm, R2 may be 30 kOhm and Rs may be 1 kOhm; however, these resistance values are merely examples.

TABLE I

| Bypass Switch 66a | Bypass Switch 66b | Total resistance |
| --- | --- | --- |
| OPEN | OPEN | R1 + R2 |
| OPEN | CLOSED | R1 + Rs |
| CLOSED | OPEN | R2 + Rs |
| CLOSED | CLOSED | 2Rs |

Thus, by selectively controlling the switches 66a, 66b of the resistor circuit 54', the bandwidth of the filter circuit 30' may be adjusted. It should be appreciated that other examples of resistor circuit 54' also exist—e.g., including use of additional arrangements of resistors coupled in series and/or parallel.

Figure 5:
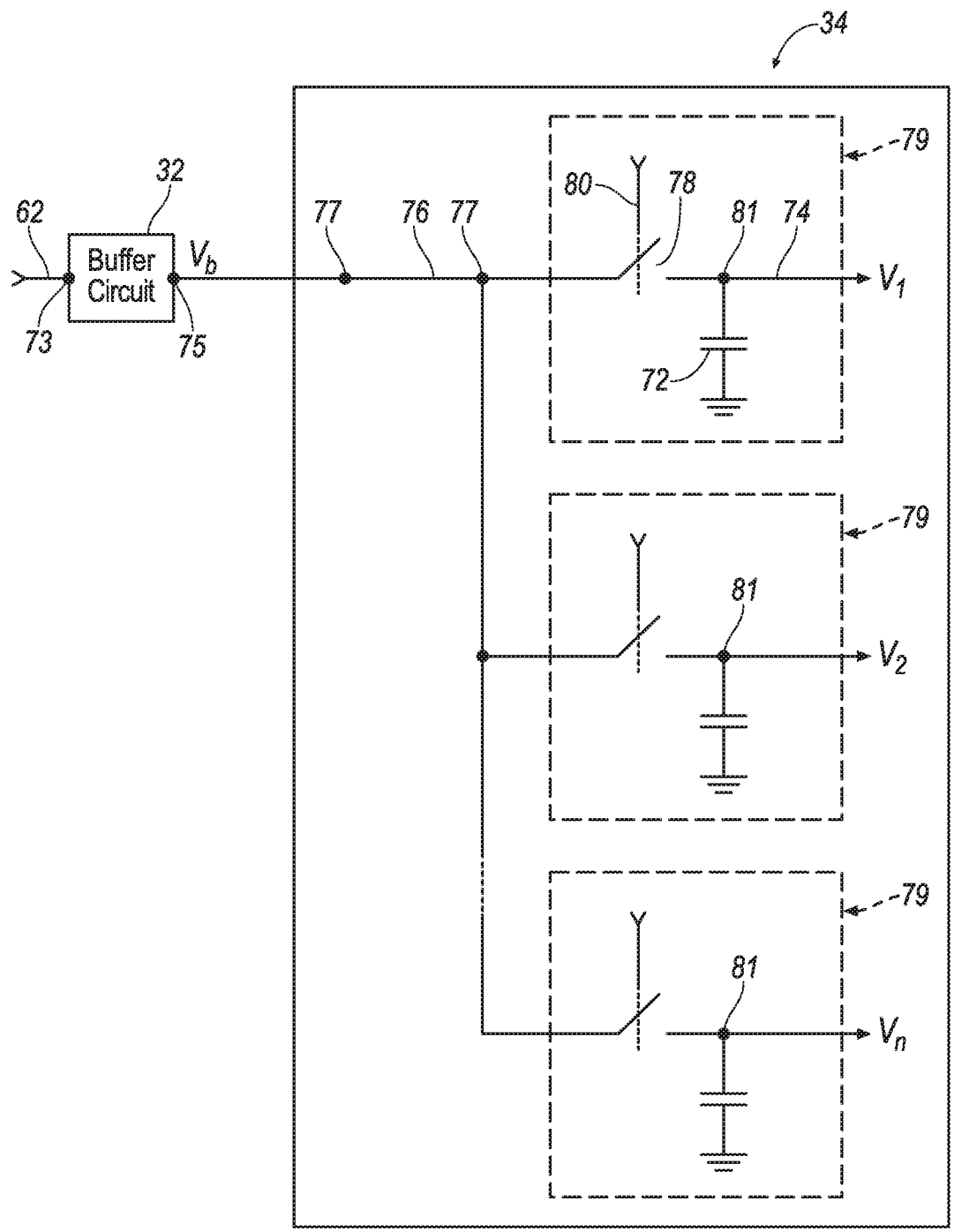
FIG. 5 is an electrical schematic diagram illustrating a buffer circuit and an analog memory circuit both shown in FIG. 2.

FIG. 5 illustrates the analog sampling circuit including buffer circuit 32 and analog memory circuit 34. Buffer circuit 32 may be a source follower, push-pull, amplifier in unity-gain feedback or other suitable electronic buffer amplifier. These other implementations of buffer circuit 32 will be appreciated by those skilled in the art. Output 62 (voltage $V_f$) of the filter circuit 30 is connected to an input 73 of buffer circuit 32, and an output 75 (voltage $V_b$) of the buffer circuit 32 is connected to an input 76 of the analog memory circuit 34 at node 77.

FIG. 5 also illustrates an example implementation of analog memory circuit 34. According to at least the illustrated example, the analog memory circuit 34 includes a plurality of analog sampling circuits 79. Each analog sampling circuit 79 includes a capacitor 72 with a first terminal connected to the output of a switch 78, and a second terminal connected to a constant potential such as ground. Switch 78 has an input connected to node 77 and has a control input 80 actuated by a digital sample clock signal. Analog memory circuit 34 includes a plurality of these sequentially-clocked analog sampling circuits 79 each coupled to node 77 as well. According to a non-limiting example, analog memory circuit 34 may include between 10 and 1000 sequentially-clocked analog sampling circuits 79—thereby having a suitable quantity to store data regarding several return pulses. Shown in FIG. 5 are only three exemplary analog sampling circuits 79 for the sake of clarity. According to at least one example, each of the analog sampling circuits 79 may be identical; therefore, only one will be explained.

Sequentially-clocked analog sampling circuit 79 typically includes a switch 78 and a capacitor 72, wherein the switch 78 is connected between node 77 and a node 81 (voltage $V_i$), and wherein capacitor 72 is coupled between node 81 and ground. (Each circuit 79 may have a different input voltage as a function of time; thus, "i" of $V_i$ may be designated 1, 2, . . . , n.). As will be explained more below, by selectively actuating switches 78 (i.e., closing one of the switches 78), each of the circuits 79 may be used to store a 'time sample' (e.g., a sample voltage) of a portion of an electrical signal received via node 77.

Voltages $V_1, V_2, \ldots, V_n$ of analog memory circuit 34 may be digitized by an analog to digital converter (not shown) and received as digitized voltage samples by computer 16, as best shown in FIG. 2. In some cases, the processor 18 will have on-board ADCs for the analog-to-digital conversion, a common feature on many signal processing microcomputer integrated circuits. Thus, computer 16 is coupled to the analog memory circuit 34. More particularly, computer 16 may be coupled to each of the nodes 81 so that it may read the stored time slices.

Other examples of the receiver circuit 28 of pixel 26 exist as well. However, before describing some of these examples, an example operation of sensor 14 will be described. According to a non-limiting example, the computer 16 may be programmed to control a plurality of transmitter/receiver pairs 22, 24 of the sensor 14 to detect objects (such as object 12) within a sensor field of view. As operation of each pair 22, 24 may be similar, the operation of only one transmitter/receiver pair 22, 24 will be described.

A general operation of the sensor 14 may include the sensor 14 and computer 16 being powered by a power source (not shown) onboard the vehicle 10. At a suitable time prior to moving the vehicle, the power source is activated. Thereafter, computer 16 may start the sampling clock and command a laser transmit pulse from transmitter 22. The light may be reflected from a surface of object 12, and the receiver 24, in an active state, may receive the reflected beam (also called a return, a return beam, or a return pulse). As used herein, an active state means the sensor 14 is powered and the receiver 24 (and its components such as the receiver circuit 28) are ready to receive the return pulse. After receiving the return pulse, computer 16 may determine a range (e.g., a distance) between the sensor 14 and the surface of the object 12 using a time of flight (TOF) calculation. A typical TOF calculation would be the speed of light multiplied by the measured change in time ($\Delta t$) of a return pulse; wherein $\Delta t$ equals a time of return after the time of the initiated clock. Typically, a sensor installation 14 includes multiple transmitter/receiver pairs 22, 24; thus, numerous range measurements from various fields of view are received, and using these measurements, computer 16 determines a so-called three-dimensional (3D) point cloud. A point cloud is the common term for a collection of points which may define one or more surfaces of object 12. Point cloud data may be used by computer 16 to generate a 3D map of an area around the sensor 14, e.g., various sides of building, trees, road surface, etc. Thereafter, computer 16 or other computers onboard vehicle 10 may control vehicle propulsion, braking, and/or steering based on detection of object 12 or the like.

A more specific description of the operation of the receiver 24 follows. Referring again to FIG. 3, powering the receiver 24 may include providing a predetermined detector voltage supply (e.g., 8V) at $V_{det}$. In some examples, switches 66a, 66b, inputs 80, etc. (FIGS. 4A, 4B, 5) may also be powered by a digital logic voltage level of 2.5V or other suitable voltage. In this manner, when a return pulse is received at pixel 26, photosensitive element 40 may provide via output 46 a photocurrent pulse ($i_{pe}$) that corresponds with a magnitude of the received and transduced light. Herein, current $i_{pe}$ is also referred to as a photoelectric pulse current, as it is created by reception of the return pulse.

At node 52, pulse current $i_{pe}$ is converted into a voltage pulse $V_p$ by passing through logarithmic-signal circuit 38 to ground. Circuit 38 is referred to as a logarithmic-signal circuit based on the gradual (e.g., logarithmic) change of voltage ($V_p$) with current $i_{pe}$. In general, the logarithmic voltage compression of the logarithmic-signal circuit 38 improves the dynamic range of the receiver circuit 28. Dynamic range refers to the ratio of the maximum photoelectric pulse current to the minimum photoelectric pulse current that can be received by receiver circuit 28. The maximum photoelectric pulse current is the highest photoelectric pulse current that does not cause saturation in the photosensitive element 40 or the voltage at nodes 60, 62 or 76. The minimum photoelectric pulse current is M times higher than the input-referred noise of the receiver. The factor M depends on the required probability of detection of a return pulse. For higher probability of detection, the factor M would be higher, and therefore the calculated dynamic range somewhat less. Therefore, dynamic range is a somewhat subjective characteristic of a pulse receiver subsystem.

The filter circuit 30 may suppress noise frequencies of the voltage pulse $V_p$ that exceed a predetermined filter cutoff frequency so that node 63 measures the filtered voltage $V_f$. According to at least one example, resistor circuit 54 is tuned suitably to adjust a filter bandwidth, as described above. The choice of bandwidth may be calculated dynamically, or set in a factory calibration sequence, and may depend on various factors such as the rise/fall time of the transmitted laser pulse, the frequency and amplitude response of the photodiodes, the dark current or background noise level of the photodetectors and the sampling frequency of the analog memory circuit 34. According to another bandwidth adjustment example, computer 16 determines whether to actuate (and thereby close) switch 66a, switch 66b, or both.

The buffer circuit 32 receives voltage $V_f$ at input 73 (FIG. 5). Thereafter, buffer amplifier circuit 32 replicates the input signal and provides a low-impedance drive capability to output 75 (voltage $V_b$) without loading the input signal at node 73. Buffering techniques and the electrical circuits employed to execute such buffering techniques are known to those skilled in the art.

According to the illustrated example, analog memory circuit 34 receives voltage $V_b$ at node 77, which is sampled consecutively by one of the sampling circuits 79. According to one example, only one of the switches 78 may be actuated to a closed position at a time—as controlled by computer 16 via respective input 80. Further, the switches 78 may be moved selectively, one at a time, to a closed position according to a predetermined sequence in order to capture voltage information regarding a pulse return. When switch 78 of one of the circuits 79 is in the closed position, the respective capacitor 72 charges to the voltage present at node 77. Once respective switch 78 is actuated to the open position again, the sampled voltage value is stored on the capacitor 72 until computer 16 reads out the value. For example, by sequentially repeating this operation, voltage values of the return pulse may be sampled at 1 nanosecond intervals (e.g., as multiple time slices), and computer 16 may be able to reconstruct a shape and profile of the return pulse having a width of 5 nanoseconds. Further, computer 16 may be able to determine a peak of the return pulse and that peak may be used to accurately calculate Δt and thereby determine a range of the respective return pulse.

Figure 6:
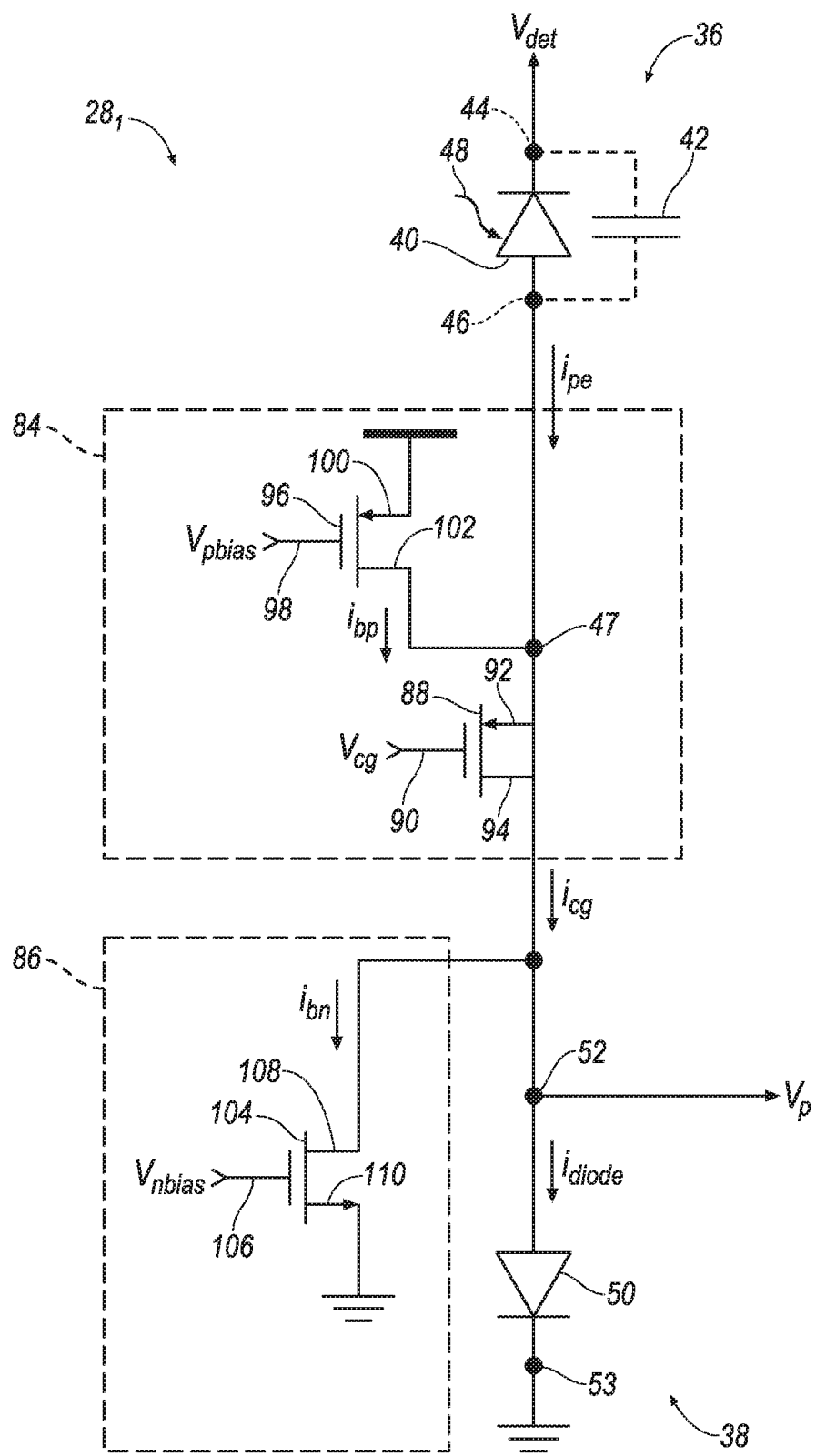
FIG. 6 is an electrical schematic diagram of the receiver circuit further comprising an impedance-reducing circuit and a current bypass circuit.

As discussed above, other examples of the receiver circuit 28 of pixel 26 exist as well. In each of the examples which follow like or identical elements are designated with like reference numerals. For example, FIG. 6 illustrates an example receiver circuit $28_1$. According to this example, the photosensitive input circuit 36 and logarithmic-signal circuit 38 may be coupled to an impedance-reducing circuit 84 (also called a common-gate amplifier circuit) and a current bypass circuit 86. Some aspects of receiver circuit $28_1$ may be identical to receiver circuit 28 (of FIG. 3).

According to an example, the impedance-reducing circuit 84 is coupled between the photosensitive input circuit 36 and node 52. Impedance-reducing circuit 84 may include two transistors: a common-gate transistor 88, and a bias transistor 96 connected as shown. For example, common-gate transistor 88 may be a p-channel metal-oxide-semiconductor field effect transistor (MOSFET), and bias transistor 96 may also be a p-channel MOSFET. Common-gate transistor 88 includes a first terminal 90, a second terminal 92, and a third terminal 94 (e.g., a gate, a source, and a drain, respectively), and bias transistor 96 includes a first terminal 98, a second terminal 100, and a third terminal 102 (e.g., a gate, a source, and a drain, respectively). Second terminal 100 is connected to a power supply (e.g., 2.5V), first terminal 98 may be coupled to a reference voltage, typically a digital-to-analog converter (DAC) output programmed by computer 16. Computer 16 may be a controller type of microprocessor which has several onboard DACs. Computer/controller 16 is able to adapt a reference voltage ($V_{pbias}$) to actuate bias transistor 96 to provide through third terminal 102 a bias current to common-gate transistor 88. Common-gate transistor 88 requires a minimum level of bias current to be provided at second terminal 92. First terminal 90 is connected to a reference voltage ($V_{cg}$) to set up common-gate transistor 88 for proper operation. The reference voltage ($V_{cg}$) is typically provided by a DAC output, also driven by computer/controller 16. The common-gate transistor 88 is connected to the node 52, specifically, the third terminal 94 is connected to node 52.

Current bypass circuit 86 includes a bypass transistor 104 (e.g., an n-channel MOSFET) having a first terminal 106, a second terminal 108, and a third terminal 110 (e.g., a gate, a drain, and a source, respectively). First terminal 106 is connected to a bias voltage ($V_{nbias}$). The bias voltage ($V_{nbias}$) is typically generated by a DAC. The DAC in the embodiment shown in the Figures is integral to computer/controller 16 which calculates the optimum voltage ($V_{nbias}$) to the gate terminal 106 of bypass transistor 104. Bypass transistor 104 acts to shunt the bias current provided by bias transistor 96 to ground, as second terminal 108 is connected to node 52, and third terminal 110 is connected to ground. In this manner, the bypass transistor 104 is adapted to reduce the bias current delivered to the logarithmic-signal circuit 50 thereby ensuring that diode 50 exhibits large dynamic resistance for small photocurrent pulses.

During operation of receiving circuit $28_1$, common-gate transistor 88 may reduce the impedance as seen by the photosensitive input circuit 36, thereby reducing the effect of photodiode built-in capacitance 42. Photodiode built-in capacitance 42 acts to limit the frequency response of the pulse receiver circuit 28. This effect would be much greater were impedance-reducing circuit 84 not installed. The effect is basically the same as a lowpass filter, reducing the high-frequency content in the received pulse. Excessive lowpass filtering acts to reduce the received pulse amplitude and increase the received pulse width. Any reduction in received pulse amplitude is undesirable, as it negatively impacts the maximum range of the LIDAR system. Therefore, the impedance reducing circuit 84 acts to improve frequency response, amplitude response, and thereby maximum range of the LIDAR system. The bias current supplied by bias transistor 102 adds to the photocurrent from the detector element 48, and is input to node 52 as $i_{cg}=(i_{pe}+i_{bp})$, wherein $i_{bp}$ represents the bias current of the impedance reducing-circuit 84. Accordingly, current bypass circuit 86 is configured to correspondingly reduce that current. Current bypass circuit 86 is designed to divert to ground the bias current necessary for the operation of the impedance-reducing circuit 84 as well as the dark current and DC background photocurrent received from the photosensitive input circuit 36. Dark current is a relatively small electric current that flows through a photosensitive element such as a photodiode even when no photons are entering the element; it arises from the charges generated in the photosensitive element when no outside radiation is entering the photosensitive element. The DC background photocurrent may be due to light received via receiver 24 that is emitted by sources of light other than transmitter 22 (e.g., street lighting, sunlight, vehicle light, etc.).

Equation (1) shows a relationship of current $i_{diode}$ passing through the diode 50 and the currents $i_{pe}$, $i_{bp}$ and $i_{bn}$. Here $i_{bn}$ is the bypass current generated by bypass transistor 104. The voltage value $V_{nbias}$ (and thus the bypass current $i_{bn}$) is typically selected to set up a current $i_{diode}$ which is equal to $i_{pe}$ minus any dark current and DC background photocurrent.

Equations (2)-(3) show a relationship of voltage $V_p$ at the node 52 and the current $i_{diode}$ passing through the logarithmic-signal circuit 38, wherein k=1.3806×10$^{-23}$ J/K is Boltzmann constant, T is absolute temperature (in K), q=1.602× 10$^{-19}$ C is the charge of the electron $I_s$ represents a reverse saturation current (in A) of the diode 50, and operator ln is a natural logarithm operator which is logarithm to the base of a mathematical constant e. Thus, as shown in Equation (3), the voltage $V_p$ may have a logarithmic relationship to the current $i_{diode}$ which provides a high dynamic range. Equation (4) defines a transimpedance $r_m$ of the receiver circuit $28_1$ as the dynamic resistance of diode 50 at the operating point defied by current $i_{diode}$. As shown in Equation (4), the transimpedance $r_m$ of the receiver circuit $28_1$ increases as the current $i_{diode}$ reduces. Hence, in order to keep $i_{diode}$ small and thus $r_m$ large, it is important to offset the common-gate bias current $i_{bp}$ with the bypass current $i_{bn}$. Having large transimpedance $r_m$ is beneficial for detecting small photocurrent pulses.

$$i_{diode} \cong i_{pe} + i_{bp} - i_{bn} \qquad (1)$$

$$V_t = kT/q \qquad (2)$$

$$V_p = V_t \ln\left(\frac{i_{diode}}{I_s} + 1\right) \qquad (3)$$

$$r_m = \frac{dV_p}{di_{diode}} = \frac{V_t}{i_{diode} + I_s} \qquad (4)$$

Figure 7:
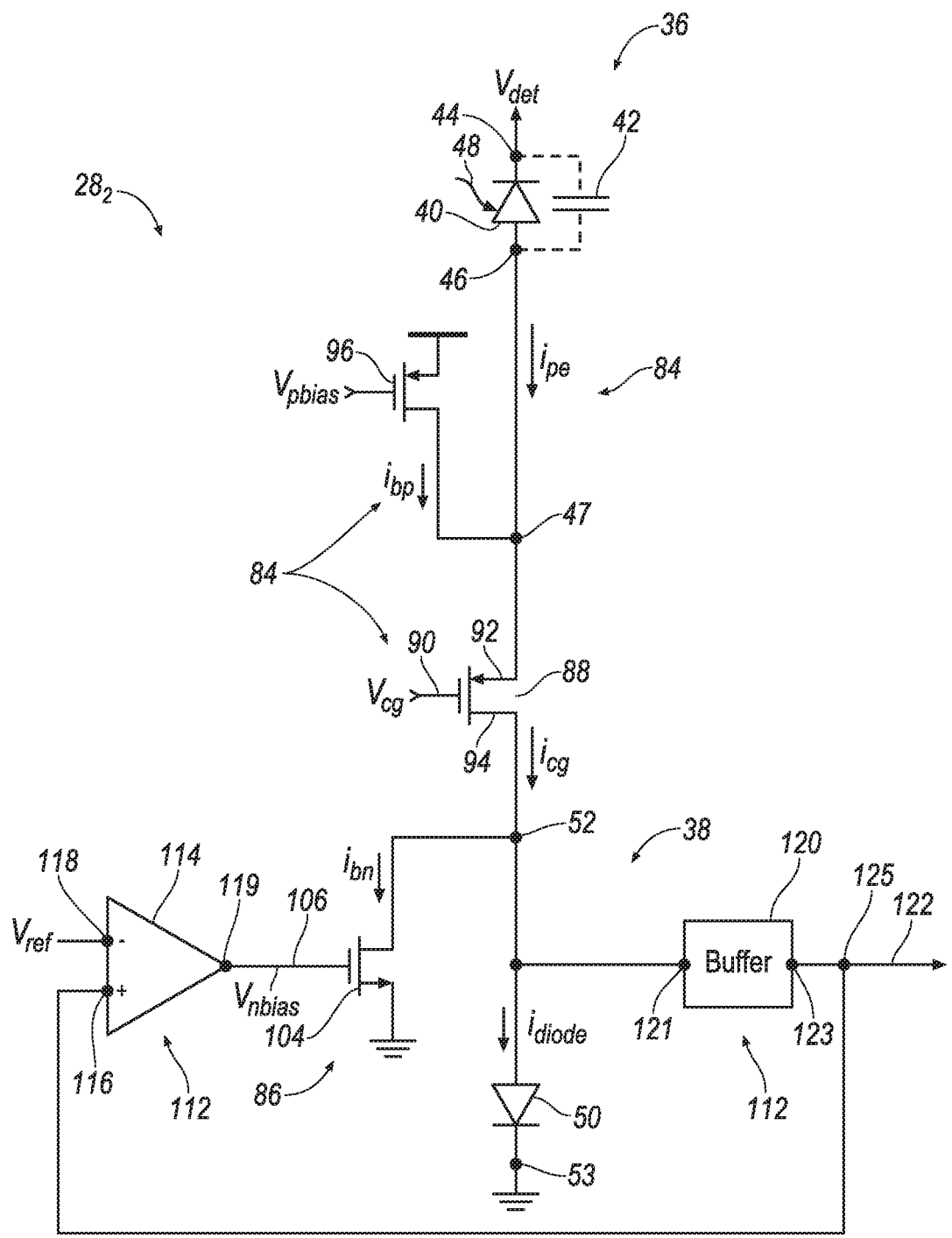
FIG. 7 is an electrical schematic diagram of the receiver circuit further comprising a servo loop circuit.

FIG. 7 illustrates yet another example of a receiver circuit which includes a servo loop circuit—receiver circuit $28_2$. Some aspects of the receiver circuit $28_2$ may be identical to those shown in FIG. 6.

FIG. 7 illustrates a buffer circuit 120 and a servo loop circuit 112 connected to receiver circuit 28 shown in FIG. 6. The buffer circuit 120 may include any suitable buffer amplifier. Buffer circuit 120 has an input 121 and an output 123. In the embodiment shown in the Figures, it is similar to buffer circuit 32. In this instance buffer circuit 120 is connected between node 52 and a node 125 (voltage $V_p$).

Servo loop circuit 112 includes an amplifier 114, which may be an operational amplifier, having a reference input 118 supplied by voltage $V_{ref}$, a feedback input 116 connected to node 125, and an output 119 (control voltage $V_{nbias}$) connected to first terminal 106 of bypass transistor 104.

Thus, in operation, servo loop circuit 112 controls the current inn of the current bypass circuit 86. When a reference voltage $V_{ref}$ is provided to input 118 and the voltage ($V_p$) at node 125 is fed back into amplifier 114, a control voltage $V_{nbias}$ at the amplifier output 119 is produced which controls bypass current inn. The net effect of servo loop circuit 112 is to hold the DC portion of voltage $V_p$ equal to the voltage $V_{ref}$. This DC bias level may be maintained regardless of the dark current of the photosensitive element 40 and/or any DC background photocurrent detected by the sensor 14. The servo loop circuit 112 acts as a lowpass filter with a 3-dB corner frequency typically below 1 MHz. The selection of the 3-dB corner frequency is chosen to avoid any interaction with the high-frequency content of the return pulse.

Figure 8:
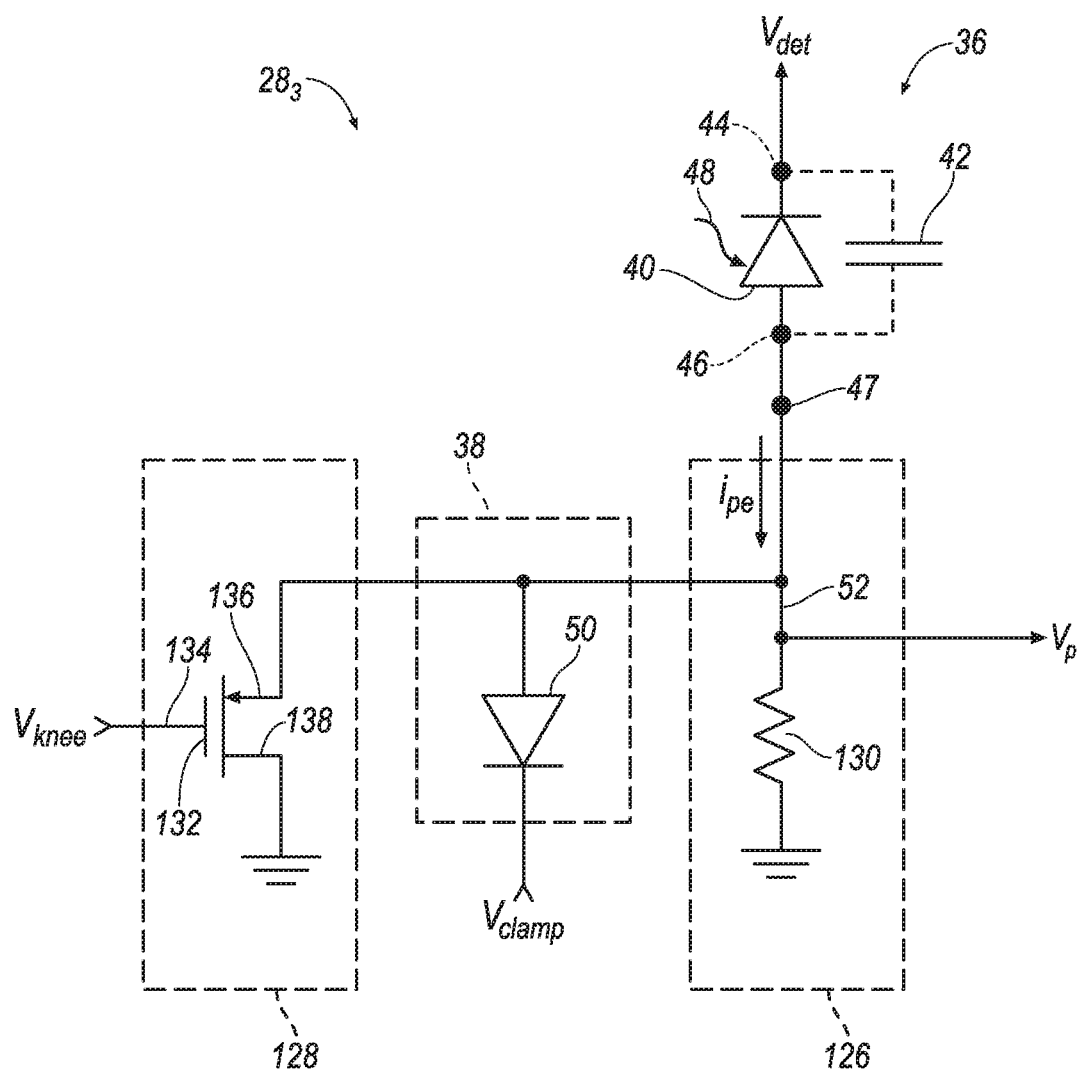
FIG. 8 is an electrical schematic diagram of the receiver circuit comprising a linear-signal circuit, a square-root-signal circuit, and a logarithmic-signal circuit.

FIG. 8 illustrates yet another example of a receiver circuit (receiver circuit $28_3$) which includes a logarithmic-signal circuit 38 and two other signal circuits: a linear-signal circuit 126 and a square-root-signal circuit 128. As discussed above with respect to logarithmic-signal circuit 38, the linear-signal and square-root-signal circuits 126, 128 describe the voltage response characteristics of the receiver circuit 28 to the photocurrent from a detected return pulse. For example, the linear-signal circuit 126 yields a linear curve when voltage is plotted against photocurrent; similarly, the square-root-signal circuit 128 yields a square-root curve when voltage is plotted against incoming photocurrent. Some aspects of the receiver circuit $28_3$ may be identical to those shown in previous examples.

In FIG. 8, the photosensitive input circuit 36 and logarithmic-signal circuit 38 are shown connected to node 52. In at least one example, the diode 50 of logarithmic-signal circuit 38 is coupled between node 52 and a predetermined voltage $V_{clamp}$, instead of between node 52 and ground as in the previous example.

Linear-signal circuit 126 may include a resistor 130 that may be coupled between node 52 and ground. The value of the resistor is typically in the range of 10 k to 200 k Ohms.

Square-root-signal circuit 128 is a p-channel MOSFET 132 comprising a first terminal 134, a second terminal 136, and a third terminal 138 (gate, drain, and source, respectively). First terminal 134 is connected to computer 16 which has an output DAC providing a threshold voltage ($V_{knee}$). Second terminal 136 is connected to node 52, and third terminal 138 is connected to a constant potential such as ground.

Figure 9A:
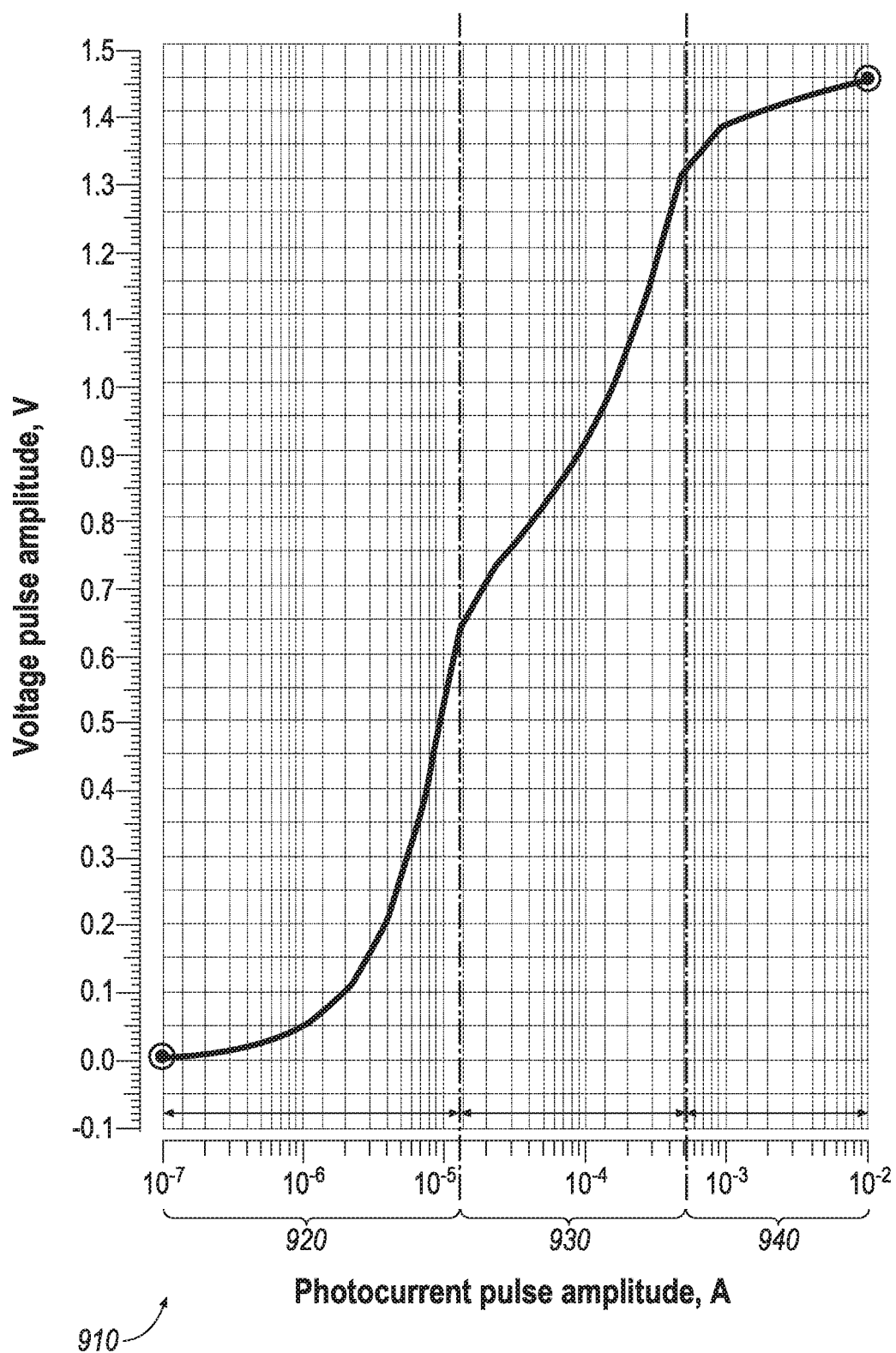
FIG. 9A is a graph of the voltage pulse amplitude plotted against photocurrent produced by the receiver circuit of FIG. 12 showing a linear profile, a square-root profile, and a logarithmic profile.

An example of operation of receiver circuit $28_3$ follows. As discussed above, the logarithmic-signal, linear-signal, and square-root-signal circuits 38, 126, 128 may yield electrical signals (at node 52) characterized by a logarithmic profile, a linear profile, and a square-root profile, respectively. More particularly, receiver circuit $28_3$ may be designed so photocurrent predominantly flows through one of circuits 38, 126, 128 depending on the input signal level. FIG. 9A plots the simulated amplitude of the voltage pulse at node 52 ($V_p$) as a function of the amplitude of the photocurrent pulse generated by photosensitive element 40. It is obtained using the receiver circuit $28_6$ of FIG. 12. Regions 920, 930 and 940 are the linear, square-root and logarithmic regions, respectively. It should be noted that this is a semi-log plot wherein the x-axis is logarithmic but the y-axis is linear; this explains why the linear region 920 is not visually linear.

Current may flow through one of the three circuits 38, 126, 128 based on the magnitude of current ($i_{pe}$). For example, when the current ($i_{pe}$) is less than a first threshold, it flows predominantly through the linear-signal circuit 126 (see region 920, FIG. 9A). When the current ($i_{pe}$) is greater than the first threshold and less than a second threshold, it flows predominantly through the square-root-signal circuit 128 (see region 930, FIG. 9A). And when the current ($i_{pe}$) is greater than the second threshold, it flows predominantly through the logarithmic-signal circuit 38 (see region 940, FIG. 9A). The voltage $V_p$ is less than $V_{knee}$ for the linear region 920, between $V_{knee}$ and $V_{clamp}$ for the square-root region 930, and greater than $V_{clamp}$ for the logarithmic region 940. In other words, voltage $V_{knee}$ controls the first threshold and voltage $V_{clamp}$ controls the second threshold. Thus, the voltage $V_p$ pulse amplitude as a function of the photocurrent pulse amplitude has: a substantially linear profile when current $i_{pe}$ levels are at low levels (region 920); a substantially square-root profile when current $i_{pe}$ levels are in a middle range (region 930); and a substantially logarithmic profile when current $i_{pe}$ levels are in the upper range (region 940). By having three regions 920, 930, 940, the receiver circuit $28_3$ achieves a voltage compression and thus high dynamic range.

Figure 9B:
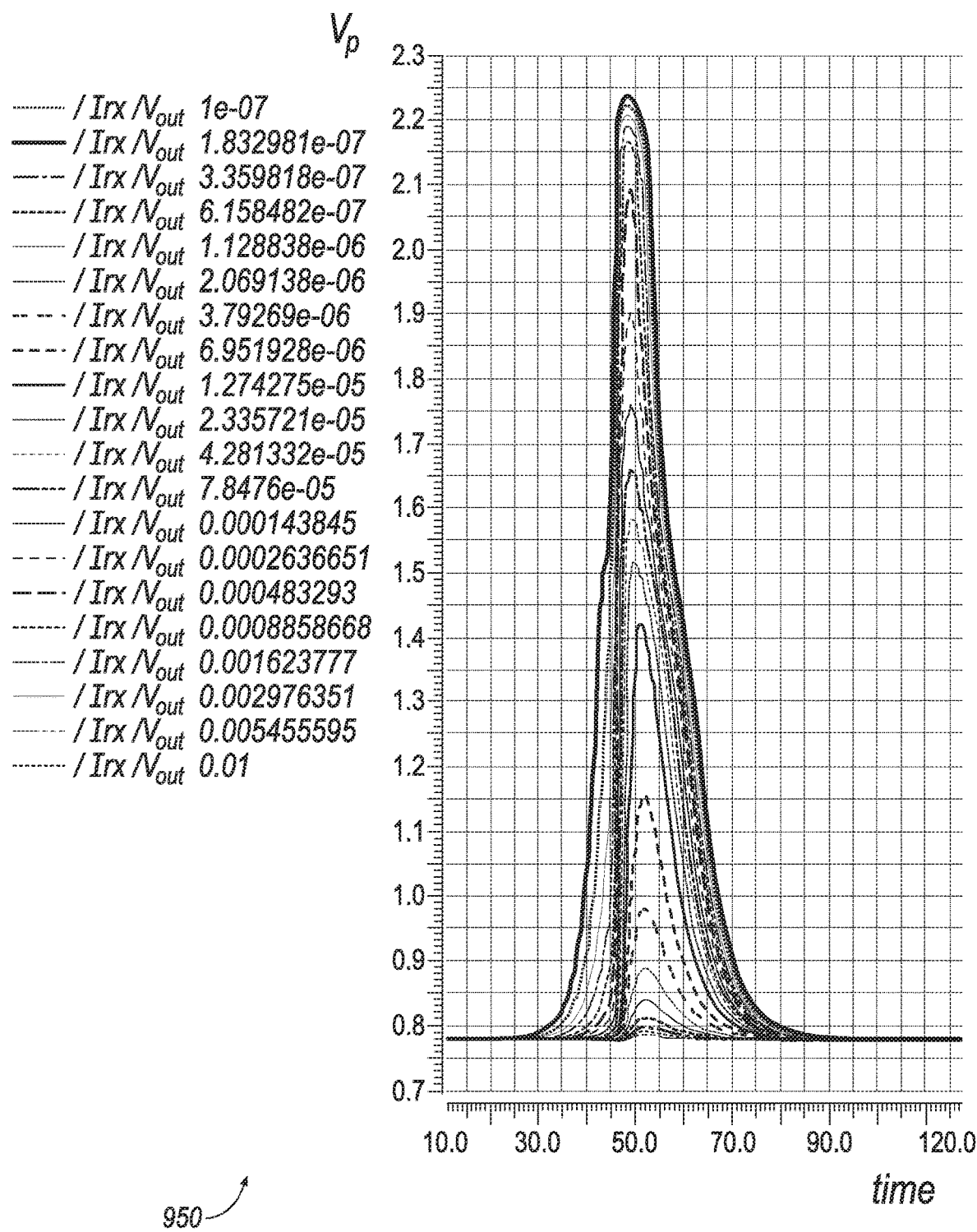
FIG. 9B is a graph of a voltage pulse response of the receiver circuit of FIG. 12.
Figure 12:
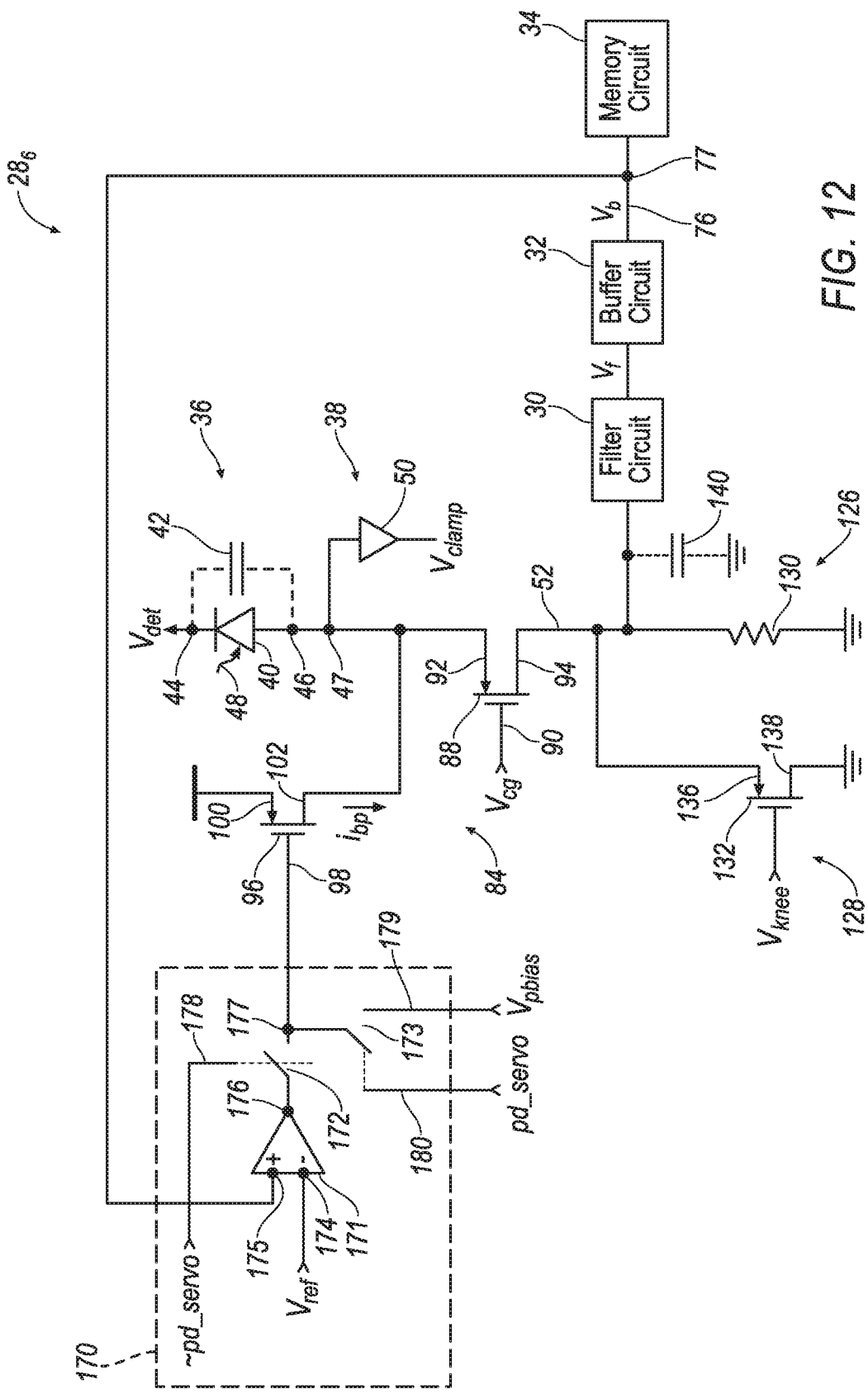
FIG. 12 is an electrical schematic diagram of an example receiver circuit further comprising a servo loop circuit coupled to the impedance-reducing circuit.

FIG. 9B shows a graph having a plurality of plots 950 of simulated return pulses, the graph being voltage $V_p$ (with the DC component removed) versus time in nanoseconds and the plots being electrical signals processed by receiver circuit $28_6$ of FIG. 12. The plots are for photocurrent pulse amplitudes from 100 nA to 10 mA. Depending on the amplitude of the photocurrent, the return pulses may have passed through any one, two, or all three regions of, linear-signal profile, square-root-signal profile or logarithmic-signal profile. It can be seen from the plots that the shapes of the voltage pulses are substantially consistent, and the voltage pulse amplitudes are not saturated. Accordingly, plots 950 are intended to illustrate that consistently-shaped and non-saturated voltage pulses can be produced over a wide range of input photocurrent signal amplitudes.

Other examples of receiver circuit also exist which may yield similar plots. For instance, according to another example, diode 50 may be a source-to-bulk PN junction of a p-channel MOSFET transistor (132). Such a configuration may yield results similar to those shown in FIGS. 9A-9B.

Figure 10:
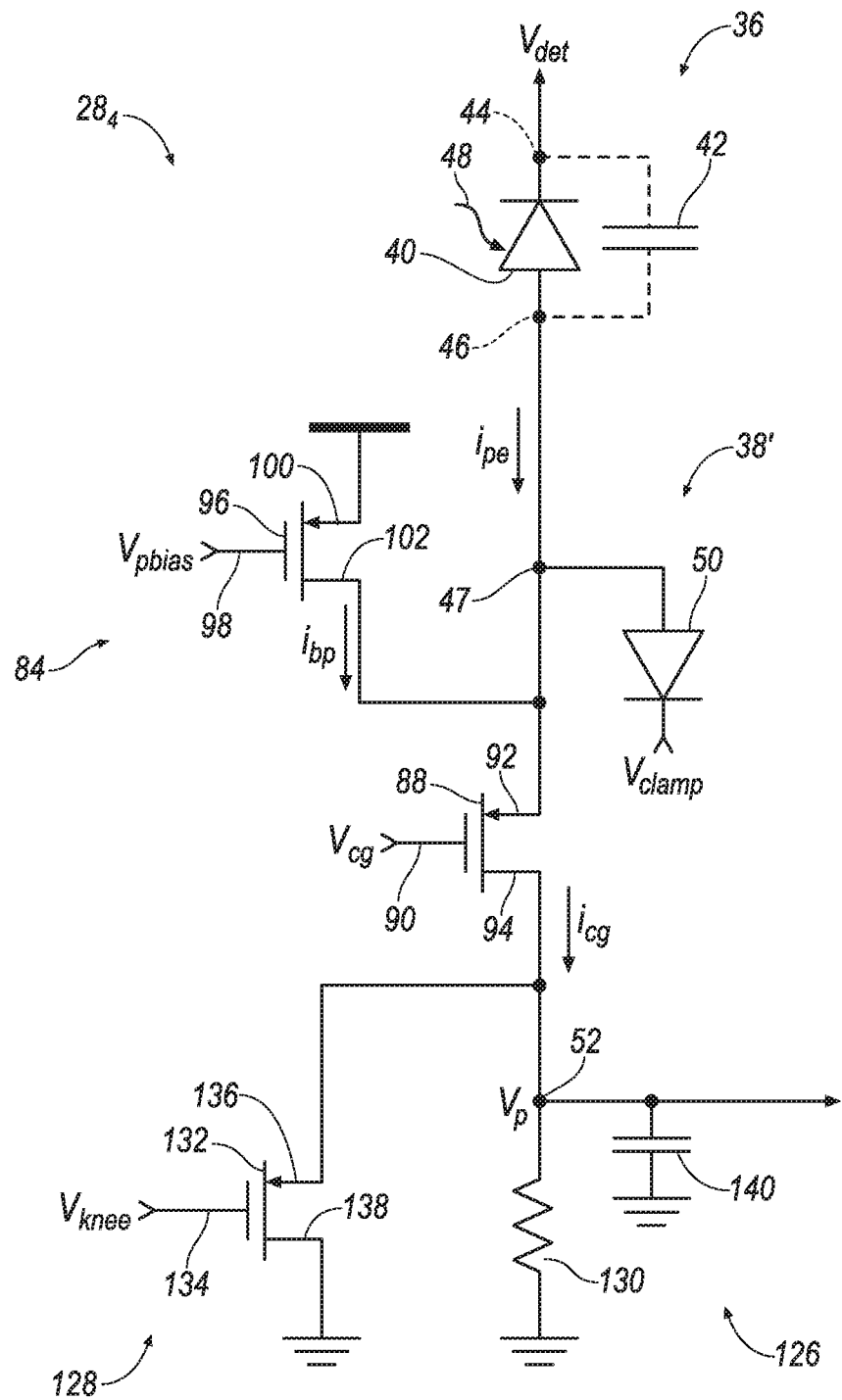
FIG. 10 is an electrical schematic diagram of an example receiver circuit comprising the impedance-reducing circuit, the square-root-signal circuit and the linear-signal circuit.

FIG. 10 illustrates yet another example of a receiver circuit (receiver circuit $28_4$) which includes linear-signal circuit 126, square-root signal circuit 128, and a logarithmic signal circuit 38' combined with impedance-reducing circuit 84. Some aspects of the receiver circuit $28_4$ may be identical to those shown in previous examples.

More particularly, impedance-reducing circuit 84 may be connected to the photosensitive input circuit 36 in a way identical to FIG. 6 (receiver circuit $28_1$). Further, linear-signal circuit 126 and square-root-signal circuit 128 may be connected to node 52 in a way identical to FIG. 8 (receiver circuit $28_3$). Logarithmic-signal circuit 38' may be coupled to node 47 (indirectly coupled to node 52); more specifically, it may be connected between node 47 and a voltage ($V_{clamp}$). Receiver circuit 284 may also include some parasitic capacitance represented in FIG. 10 as capacitor 140 connected between node 52 and ground. The capacitance value of capacitor 140 is typically much less than the capacitance value of photodiode built-in capacitance 42 (e.g., 10 times smaller).

A non-limiting example of operation of the receiver circuit 284 follows. For a current $i_{pe}$ within the linear region 920, the current $i_{pe}$ develops a voltage $V_p$ which grows substantially linearly with $i_{pe}$. The shape of the voltage pulse at $V_p$ and the transimpedance of the receiver circuit $28_4$ are determined primarily by the resistor 130 and the capacitor 140.

For a current $i_{pe}$ within the square-root region 930, voltage $V_p$ is greater than voltage $V_{knee}$, the transistor 132 turns on and conducts most of the current $i_{pe}$, resulting in a square-root profile, as discussed above. The shape of voltage pulse at $V_p$ and the transimpedance of the receiver circuit 284 are determined primarily by the drain-to-source resistance of transistor 132 and the capacitor 140.

For a current $i_{pe}$ within the logarithmic region 940, the voltage at node 47 is greater than the voltage $V_{clamp}$ and the diode 50 becomes forward-biased and conducts most of the current $i_{pe}$. As a result, the voltage at node 47 grows logarithmically with the current $i_{pe}$. In the logarithmic region 940, the voltage $V_p$ at node 52 is substantially equal to the voltage at node 47 because transistor 88 operates in the triode region. Thus, in this region, the voltage pulse amplitude at $V_p$ versus current $i_{pe}$ has a substantially logarithmic profile. The shape of the voltage pulse at $V_p$ and the transimpedance of the receiver circuit 284 are determined primarily by the resistance of the diode 50 and the capacitance at node 47. The latter is typically dominated by the photodiode built-in capacitance 42. The fact that the logarithmic-signal circuit 38' is directly coupled to node 47 instead of node 52 has the following advantages: the transimpedance in the logarithmic region 940 is not limited by the source impedance of transistor 88, and the receiver circuit 284 is more latch-up resistant since the large photocurrent pulse $i_{pe}$ in the logarithmic region 940 is shunted directly to $V_{clamp}$.

Figure 11:
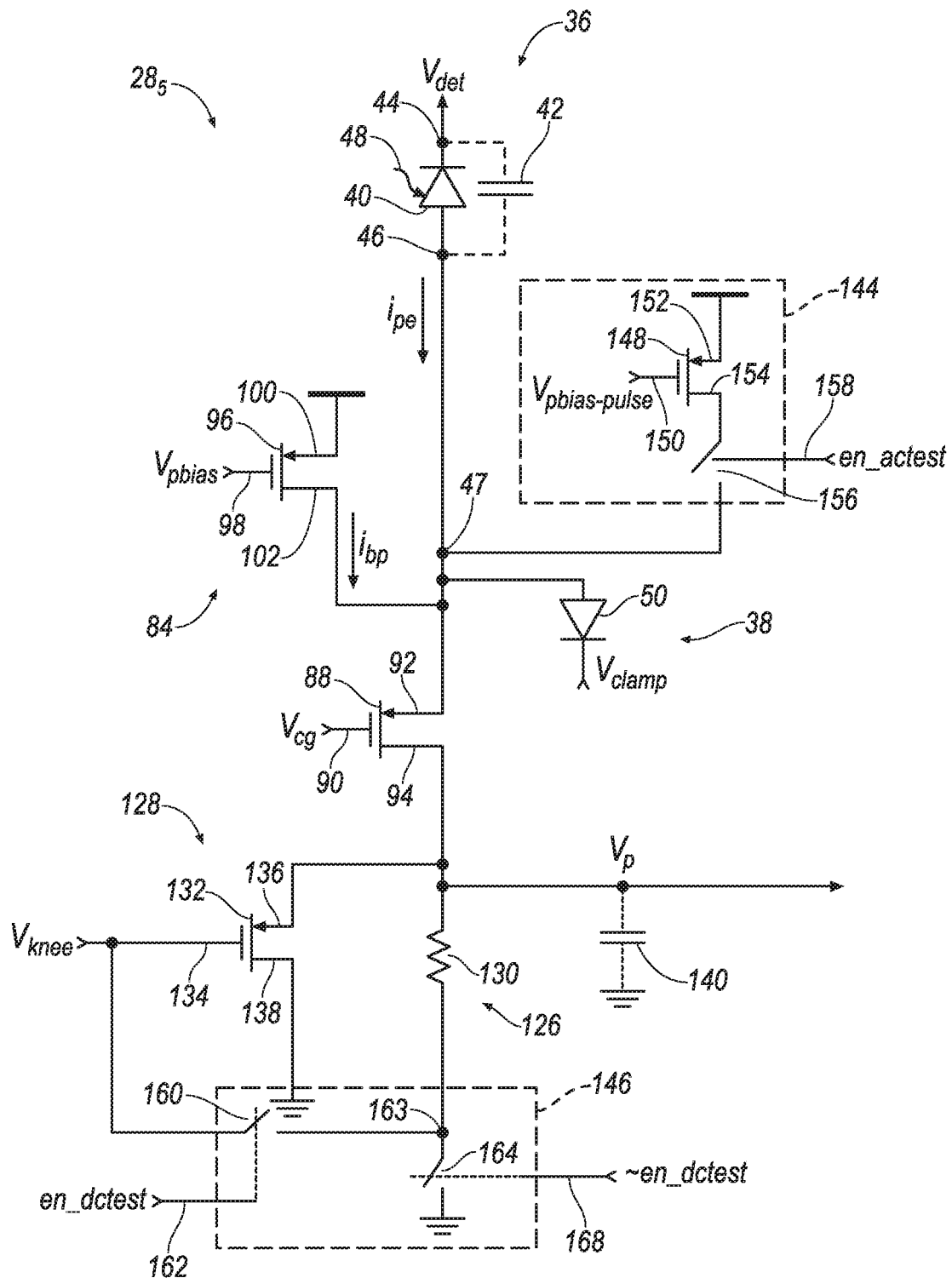
FIG. 11 is an electrical schematic diagram of the receiver circuit further comprising an AC (Alternating Current) test circuit and a DC (Direct Current) test circuit.

FIG. 11 illustrates yet another example of a receiver circuit (receiver circuit 285) which includes the receiver circuit 284 plus an AC test circuit 144 (i.e., current pulse injection circuit 144) and/or a DC test circuit 146. Some aspects of the receiver circuit $28_5$ may be identical to those shown in previous examples.

AC test circuit 144 typically includes a transistor 148 (e.g., a p-channel MOSFET) and a switch 156. Transistor 148 has a first terminal 150, a second terminal 152, and a third terminal 154 (a gate, a source, and a drain, respectively). First terminal 150 is connected to a DAC output of computer 16 which provides a bias voltage ($V_{pbias-pulse}$) to actuate transistor 148. Second terminal 152 is connected to a voltage supply (e.g., 2.5V), and third terminal 154 is connected to switch 156. Switch 156 is connected between the third terminal 154 and node 47. Thus, when switch 156 is actuated to a closed position by a control signal (en_actest) via an input 158, then third terminal 154 is connected to node 47.

In operation of the AC test circuit 144, computer 16 actuates the switch 156 to the closed position and provides voltage $V_{pbias\_pulse}$ to first terminal 150. The duration of switch 156 in the closed position may simulate the width of a photocurrent pulse, and an amplitude of the simulated photocurrent pulse may be determined by the current produced by transistor 148 when biased with voltage $V_{pbias\_pulse}$. The current pulse injection circuit 144 is adapted to provide a test of functionality or performance of receiver circuit 285.

DC test circuit 146 includes a pair of switches 164, 160. Switch 164 is connected between a terminal of resistor 130 (node 163) and ground. Switch 160 is connected between node 163 and first terminal 134 of transistor 132 (of square-root-signal circuit 128). During normal operation of receiver circuit 285, switch 164 is closed and switch 160 is open. During a DC test, switch 164 is actuated to an open position by a control signal (~en_dctest, where "~" denotes logic negation) via an input 168 and switch 160 is actuated to a closed position by a control signal (en_dctest) via an input 162.

According to at least one example, during a DC test, computer 16 may turn off the common-gate transistor 88 by providing a voltage ($V_{cg}$) at terminal 90 equal to the supply voltage. Concurrently, computer 16 may provide control signals to inputs 162, 168 thereby opening switch 164 and closing switch 160. In this state, computer 16 may perform a sweep of bias voltage $V_{knee}$ at terminal 134 to test the functionality, DC offset, gain, and voltage range of the analog signal chain downstream of the receiver circuit $28_5$. As shown in FIG. 2, the analog signal chain may include filter circuit 30, buffer circuit 32 and analog memory circuit 34.

FIG. 12 illustrates a receiver circuit $28_6$ which includes a receiver circuit (e.g., such as receiver circuit $28_4$ shown in FIG. 10) coupled to a servo loop circuit 170. The schematic diagram shown in FIG. 12 also illustrates receiver circuit $28_6$ coupled to filter circuit 30, buffer circuit 32, and analog memory circuit 34 as previously described. Servo loop circuit 170 includes an amplifier 171 which controls the bias current of impedance reducing circuit 84, a switch 172, and a switch 173. Some aspects of the receiver circuit $28_6$ may be identical to those shown in previous examples.

Amplifier 171 has a reference voltage input 174 ($V_{ref}$), a feedback input 175 coupled to node 77 (the output of buffer circuit 32), and an output 176 coupled to node 177 via switch 172. Switch 172 is connected between output 176 and first terminal 98 of bias transistor 96. When a control signal (~pd_servo, where "~" denotes logic negation) is provided via an input 178 of switch 172, switch 172 moves from a closed position to an open position.

Switch 173 is connected between node 177 and an input 179 which provides voltage $V_{pbias}$, as discussed above. When a control signal (pd_servo) is provided to an input 180 of switch 173, switch 173 moves from a closed position to an open position.

Thus, when the servo loop is disabled or powered down (control signal pd_servo is set to logic high), switch 172 is in the open position, switch 173 is in the closed position, and voltage $V_{pbias}$ is provided to first terminal 98 of bias transistor 96 thereby establishing a DC bias current $i_{bp}$. When the servo loop is enabled (control signal pd_servo is set to logic low), switch 172 is in the closed position, switch 173 is in the open position, and the output of amplifier 171 is connected to first terminal 98 of bias transistor 96. Other aspects of operation may be similar to those described above with respect to the servo loop circuit shown in receiver circuit $28_2$ (FIG. 7). For example, the output 176 of the amplifier 171 adjusts the transistor 96 DC bias current $i_{bp}$ thereby changing the DC voltage at the node 52 and consequently the DC voltage at the node 77 until the latter becomes equal to the reference voltage $V_{ref}$.

In the embodiment shown in FIG. 12, the bandwidth of the servo loop circuit 170 may be sufficiently low so the servo loop circuit 170 is relatively insensitive to the voltage pulse resulting from a return pulse (e.g., insensitive to a photocurrent pulse $i_{pe}$ of the photosensitive input circuit 36). The servo loop comprising amplifier 171 and feedback connection to node 77 is designed to establish a DC voltage level at node 77 equal to the reference voltage $V_{ref}$, regardless of the dark current and/or DC background photocurrent of photosensitive input circuit 36.

Figure 13:
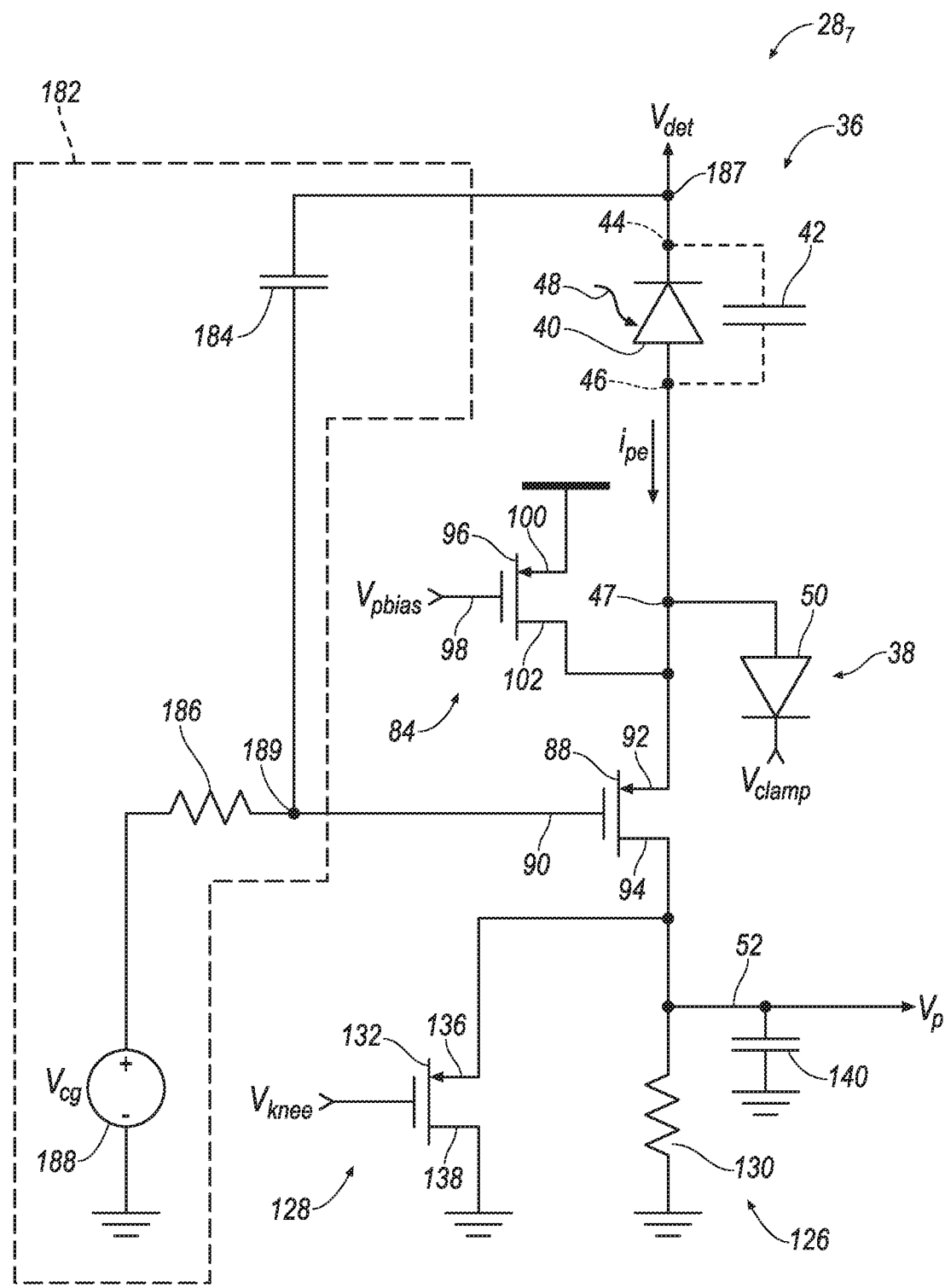
FIG. 13 is an electrical schematic diagram of an example receiver circuit further comprising a common-mode noise-rejection circuit.

FIG. 13 illustrates another example of a receiver circuit (receiver circuit $28_7$) which includes a receiver circuit connected to a noise-rejection circuit 182 (also called a static gate decoupling circuit). Some aspects of the receiver circuit $28_7$ may be identical to those shown in previous examples.

Noise-rejection circuit 182 includes a capacitor 184, a resistor 186 connected to a reference voltage source 188 ($V_{cg}$). Capacitor 184 is coupled between node 187 and node 189. Node 187 is the detector voltage supply $V_{det}$ and input 44 of photosensitive input circuit 36. Node 189 is at first terminal 90 of common-gate transistor 88. Resistor 186 is connected between node 189 and reference voltage source 188. Reference voltage source 188 is connected between resistor 186 and ground. Resistor 186 may represent a physical resistor. Alternatively, resistor 186 may represent the output impedance of an amplifier generating reference voltage $V_{cg}$.

The capacitor 184 is adapted to reject common-mode noise on the detector voltage supply such that, in operation, noise-rejection circuit 182 couples a voltage disturbance on the detector voltage supply $V_{det}$ via capacitor 184 to the first terminal 90 of common-gate transistor 88. Since the $V_{det}$ voltage disturbance is also coupled to the second terminal 92 of common-gate transistor 88 via the photodiode built-in capacitance 42, the net effect is that the drain current of common-gate transistor 88, and hence the voltage $V_p$ at node 52, is largely unaffected by the $V_{det}$ voltage disturbance. A dip in the detector voltage supply at node 187 can be caused by a sudden increase in current $i_{pe}$ due to photosensitive input circuit 36 receiving a return pulse, or by any number of neighboring pixels receiving a strong return pulse. The product of the resistance of resistor 186 and the capacitance of capacitor 184 establish a time-constant. In a preferred embodiment, this time-constant is much longer than the width of the $V_{det}$ voltage dip.

Figure 14:
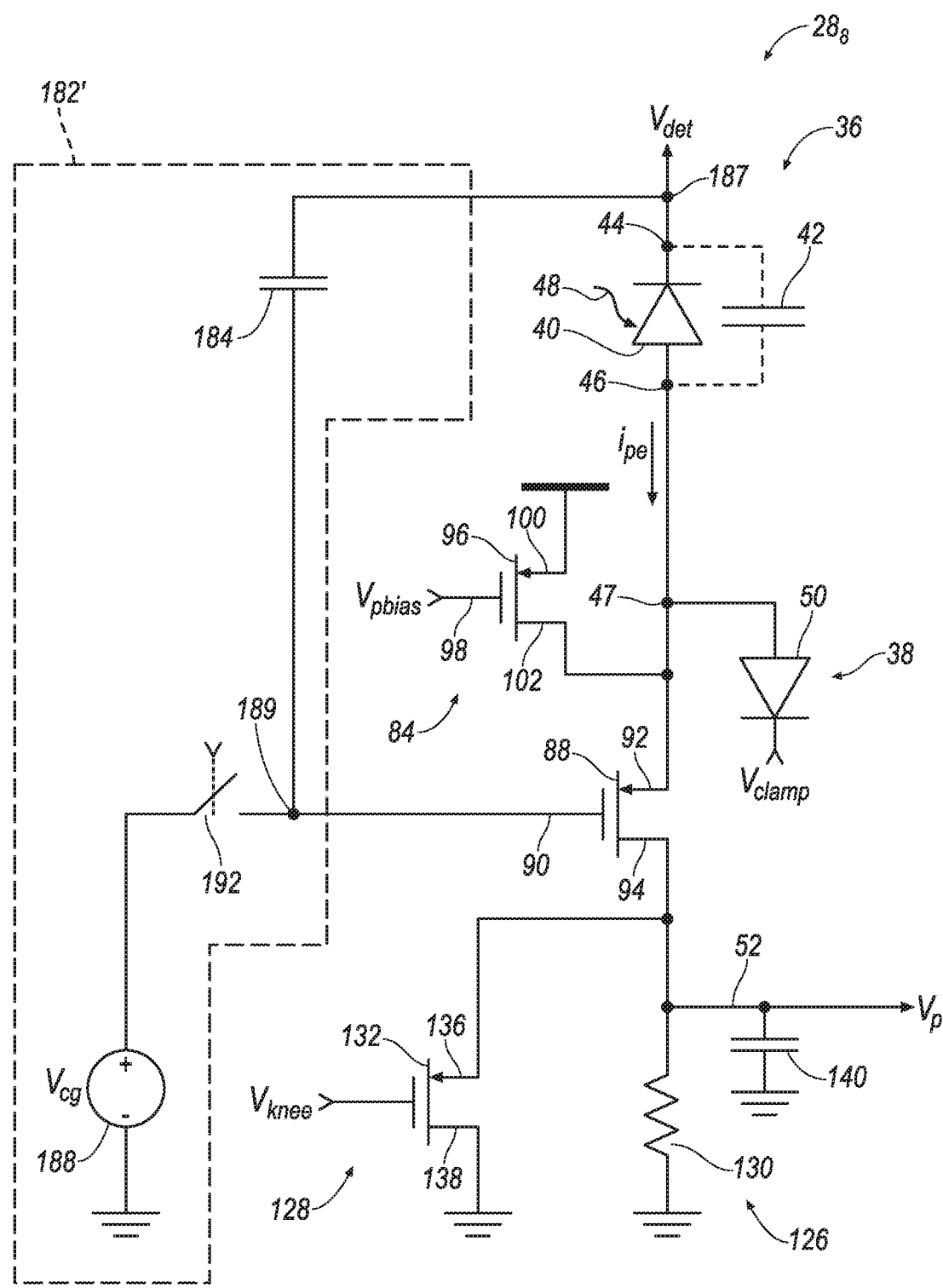
FIG. 14 is another example of an electrical schematic diagram of the receiver circuit and a common-mode noise-rejection circuit.

FIG. 14 illustrates another example of a receiver circuit (receiver circuit 288) which includes a receiver circuit having a noise-rejection circuit 182' (also called a dynamic gate decoupling circuit). In the embodiment shown in FIG. 14, receiver circuit $28_8$ may be identical to receiver circuit $28_7$ except switch 192 is substituted for resistor 186. Aspects of receiver circuit $28_8$ which are identical to previous examples will not explained again.

Computer 16 controls via a control signal switch 192 to move from an open position to a closed position. Actuating switch 192 to the closed position resets the noise-rejection circuit 182' by setting the voltage at first terminal 90 of the common-gate transistor 88 to the reference voltage $V_{cg}$. For example, this may occur before the laser pulse is transmitted or when computer 16 anticipates no incoming return pulses.

A sensor is described that includes a transmitter and a receiver. The receiver may include one or more pixels. At least one pixel includes a receiver circuit which includes at least a photosensitive input circuit and a logarithmic-signal circuit. Various examples of the receiver circuit have been described which may improve sensor performance.

With regard to the processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

The invention claimed is:

1. A light detection and ranging (LIDAR) sensor, comprising:
    an optical pulsed transmitter; and
    an optical receiver, wherein the receiver includes:
        a plurality of pixels, wherein each pixel includes a receiver circuit, wherein each receiver circuit includes:
            a photosensitive input circuit having at least two terminals, wherein a first terminal is coupled to a detector voltage supply and a second terminal is coupled to a pulse voltage node;
            a logarithmic-signal circuit including at least one PN junction, wherein the P-type terminal is coupled to the pulse voltage node and the N-type terminal is coupled to a constant potential; and
            an impedance-reducing circuit electrically coupled to the photosensitive input circuit and to the logarithmic-signal circuit, the impedance-reducing circuit including at least a common-gate transistor coupled to the pulse voltage node;
            wherein the impedance-reducing circuit includes a bias transistor wherein the bias transistor provides DC bias current to the common-gate transistor.

2. The LIDAR sensor of claim 1, further comprising a common-mode noise-rejection circuit that includes a capacitor coupled between the gate of the common-gate transistor and the detector voltage supply and adapted to reject common-mode noise on the detector voltage supply.

3. The LIDAR sensor of claim 2, wherein the common-mode noise-rejection circuit further comprises a selectively-actuatable switch coupled between the gate of the common-gate transistor and a reference voltage, wherein the switch is in a closed position, when no photocurrent pulse is expected and wherein the switch is in an open position, when a photocurrent pulse is expected.

4. The LIDAR sensor of claim 1, further comprising a bypass circuit electrically coupled to the logarithmic-signal circuit and including at least a bypass transistor having a terminal coupled to the pulse voltage node, wherein, the bypass circuit is adapted to reduce the bias current delivered to the logarithmic-signal circuit.

5. The LIDAR sensor of claim 4, further comprising:
a servo loop circuit including an amplifier having a first and a second input and an output, wherein the first amplifier input is coupled to the pulse voltage node, the second amplifier input is a reference voltage, and the amplifier output is coupled to the gate of the bypass transistor of the bypass circuit and adapted to control the current at the logarithmic-signal circuit.

6. The LIDAR sensor of claim 1, further comprising:
a servo loop circuit including an amplifier having a first and a second input and an output, wherein the first amplifier input is coupled to the pulse voltage node, the second amplifier input is a reference voltage, and the amplifier output is coupled to the gate of the bias transistor of the impedance-reducing circuit.

7. The LIDAR sensor of claim 1, further comprising:
a linear-signal circuit including a resistor coupled between the pulse voltage node and the constant potential; and
a square-root-signal circuit including a transistor including a first terminal coupled to the pulse voltage node and a second terminal coupled to the constant potential.

8. The LIDAR sensor of claim 7, wherein, the source of the transistor of the square-root-signal circuit is coupled to the pulse voltage node, the drain of the transistor is coupled to the constant potential, and the gate of the transistor is coupled to a control voltage.

9. The LIDAR sensor of claim 7, wherein, a photocurrent predominantly flows: through the linear-signal circuit when the photocurrent is less than a first threshold; through the square-root-signal circuit when the photocurrent is greater than the first threshold and less than a second threshold; and through the logarithmic-signal circuit when the photocurrent is greater than the second threshold.

10. The LIDAR sensor of claim 1, further comprising:
an analog memory circuit coupled to the pulse voltage node,
wherein the analog memory circuit includes a plurality of sequentially selected capacitive circuits which store voltage samples of a return pulse received by the photosensitive input circuit, wherein each of the plurality of sequentially selected capacitive circuits is readable by a computer.

11. The LIDAR sensor of claim 1, further comprising an adjustable low-pass filter circuit coupled to the pulse voltage node, wherein the bandwidth of the filter circuit is adjusted by a computer control output.

12. The LIDAR sensor of claim 11, wherein the bandwidth of the filter circuit is varied by adjusting a resistance value.

13. The LIDAR sensor of claim 1, further comprising:
a computer, including a digital processor and digital memory storing instructions executable by the digital processor to:
determine a range associated with a return pulse by:
selecting and actuating each of a plurality of capacitive circuits, wherein the plurality of capacitive circuits is coupled to the photosensitive input circuit via the pulse voltage node; and wherein the actuation includes moving a switch from an open position to a closed position and to the open position again; and
thereafter, reading a voltage stored in each of the capacitive circuits.

14. A light detection and ranging (LIDAR) sensor, comprising:
an optical pulsed transmitter; and
an optical receiver, wherein the receiver includes:
a plurality of pixels, wherein each pixel includes a receiver circuit, wherein each receiver circuit includes:
a photosensitive input circuit having at least two terminals, wherein a first terminal is coupled to a detector voltage supply and a second terminal is coupled to a pulse voltage node;
a logarithmic-signal circuit including at least one PN junction, wherein the P-type terminal is coupled to the pulse voltage node and the N-type terminal is coupled to a constant potential;
a linear-signal circuit, including a resistor coupled between the pulse voltage node and the constant potential, and
a square-root-signal circuit including a transistor including a first terminal coupled to the pulse voltage node and a second terminal coupled to the constant potential.

15. A light detection and ranging (LIDAR) sensor, comprising:
an optical pulsed transmitter; and
an optical receiver, wherein the receiver includes:
a plurality of pixels, wherein each pixel includes a receiver circuit, wherein each receiver circuit includes:
a photosensitive input circuit having at least two terminals, wherein one terminal is coupled to a detector voltage supply and the other terminal is coupled to a pulse voltage node;
a logarithmic-signal circuit including a PN junction, wherein the P-type terminal is coupled to the pulse voltage node and the N-type terminal is coupled to a constant potential;
a linear-signal circuit including a resistor coupled between the pulse voltage node and the constant potential,
a square-root-signal circuit including a transistor including a first terminal coupled to the pulse voltage node and a second terminal coupled to the constant potential; and
an impedance-reducing circuit coupled to the photosensitive input circuit, the linear-signal circuit, the square-root-signal circuit, and the logarithmic-signal circuit, wherein the impedance-reducing circuit includes a common-gate transistor coupled to the pulse voltage node, and a bias transistor providing DC bias current to the common-gate transistor.

16. The LIDAR sensor of claim 15, further comprising a common-mode noise-rejection circuit that includes a capacitor coupled between the gate of the common-gate transistor and the detector voltage supply and adapted to reject common-mode noise on the detector voltage supply.

17. The LIDAR sensor of claim 15, further comprising a servo loop circuit including an amplifier having a first and a second input and an output, wherein the first amplifier input is coupled to the pulse voltage node, the second amplifier input is a reference voltage, and the amplifier output is coupled to the gate of the bias transistor of the impedance-reducing circuit.

18. The LIDAR sensor of claim 15, further comprising a current pulse injection circuit coupled to the pulse voltage node, wherein the current pulse injection circuit is adapted to provide a test of functionality or performance.

* * * * *